United States Patent
Kishi et al.

(10) Patent No.: US 6,316,606 B1
(45) Date of Patent: *Nov. 13, 2001

(54) POLYMERIC COMPOUND COMPRISING GLYCOPOLYMER AND A METHOD FOR DECOMPOSING THE SAME

(75) Inventors: Hiroyoshi Kishi, Atsugi; Toyoko Kobayashi, Kawasaki; Kiyoshi Sakai, Hachiohji; Norio Kaneko, Atsugi; Kazumi Tanaka, Yokohama; Chieko Mihara, Isehara; Toshihiko Takeda; Yoshihiko Kikuchi, both of Atsugi, all of (JP)

(73) Assignee: Canon Kabusiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,128

(22) Filed: Jun. 18, 1997

(30) Foreign Application Priority Data

Jun. 19, 1996 (JP) .................................................. 8-158175
Mar. 14, 1997 (JP) .................................................. 9-079251

(51) Int. Cl.$^7$ ............................. C07H 15/00; C07G 3/00
(52) U.S. Cl. ........................ 536/4.1; 536/18.5; 536/18.6; 536/58; 536/107; 536/115; 536/123.1; 536/123.12; 536/123.13
(58) Field of Search .................... 536/4.1, 18.5, 536/18.6, 58, 107, 115, 123.1, 123.12, 123.13

(56) References Cited

U.S. PATENT DOCUMENTS

| | | | |
|---|---|---|---|
| 3,950,282 | * 4/1976 | Gilbert et al. | 260/9 |
| 4,429,076 | * 1/1984 | Saito et al. | 525/57 |
| 5,227,415 | * 7/1993 | Masuda et al. | 524/17 |
| 5,444,107 | * 8/1995 | Ajioka et al. | 523/124 |
| 5,478,386 | * 12/1995 | Itoh et al. | 106/169 |
| 5,576,020 | * 11/1996 | Iritani et al. | 424/465 |
| 5,644,012 | * 7/1997 | Iritani et al. | 527/311 |
| 5,663,254 | * 9/1997 | Lee et al. | 526/238.2 |
| 5,807,943 | * 9/1998 | Lee et al. | 526/238.2 |

FOREIGN PATENT DOCUMENTS

| | | |
|---|---|---|
| 339188 | 8/1959 | (CH) . |
| 44 04 840 A1 | * 8/1995 | (DE) . |
| 0721784 | 7/1996 | (EP) . |
| 0 731 161 A2 | * 9/1996 | (EP) . |
| 5-287043 | 11/1993 | (JP) . |
| WO92-21765 | 10/1992 | (WO) . |
| WO93-23456 | 11/1993 | (WO) . |
| WO96-04014 | 2/1996 | (WO) . |

OTHER PUBLICATIONS

Staněk et al., "The Oligosaccharides", Academic Press, Inc., pp. 296–320, 1965.*

Patil, et al, "Chemo Enzymatic Synthesis of Novel Sucrose–Containing Polymers", Macromolecules, 24, 11, 3462–2463 (1991).

(List continued on next page.)

Primary Examiner—Ralph Gitomer
Assistant Examiner—Devesh Khare
(74) Attorney, Agent, or Firm—Fitzpatrick, Cella, Harper & Scinto

(57) ABSTRACT

The present invention is an enzyme-decomposable polymer compound having recyclable decomposition products. The polymeric compound is a glycopolymer of a saccharide having only glucopyranose rings and a second component. In addition, the glycopolymer may contain molecular chains having at least one type of repeating unit, which chains are crosslinked by a saccharide having only glucopyranose rings.

21 Claims, 14 Drawing Sheets

OTHER PUBLICATIONS

Miyamoto, et al, "Synthesis of Glycopolymers and their Application to Biofunctional Materials", High Polymers, Soc. Poly. Sci. Japan, 45, 8, 553–557 (1996).

Patil, et al.; "Enzymatic Synthesis of a Sucrose–Containing Linear Polyester in Nearly Anhydrous Organic Media" Biotech. & Bioeng., 37, pp. 639–646 (1991).

Kurita, et al., "Synthetic Polymers . . . Direct Polycondensation"; J. Polym. Sci., 18, 365–370 (1980).

Kurita, et al., "Synthetic Polymers . . . Acid Chlorides"; J. Polym. Sci., 18, 359–364 (1980).

Kurita, et al., "Chitin–Related . . . Membranes"; Rep. Asahi Glass Found. Ind. Techn., 52, 157–163 (1988).

Database WPI, Week 9112, Derwent, AN 91–084517 for JP3–31294 (1991).

Kurita, et al., "Synthetic polymers . . . Polyurethanes"; Makromol. Chem. 180, 855–858 (1979).

Chem. Abstracts, vol. 84, No. 22 (1976), Abst. No. 151889.

J. Polym. Sci, Polym. Chem. Ed., vol. 18, pp. 359–364 (1980).

J. Polym. Sci, Polym. Chem. Ed., vol. 18, pp. 365–370 (1980).

Rep. Asahi Glass Found. Ind. Technol., vol. 52 (1988) 157–163.

* cited by examiner

FIG. IA
FIG. IB
FIG. 2
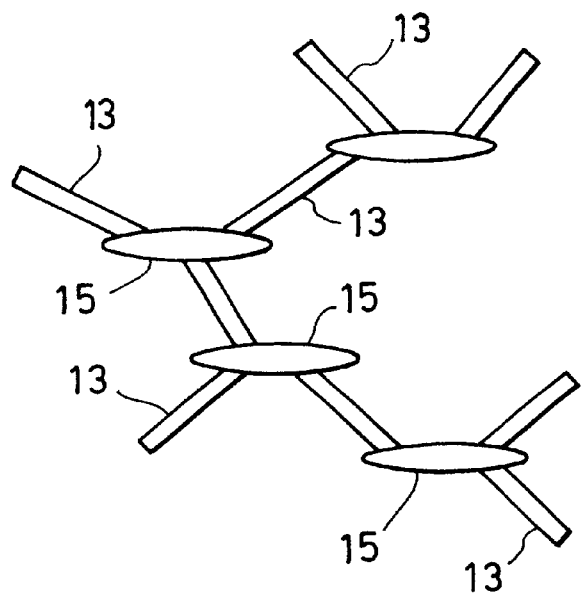

POLYMERIC COMPOUND COMPRISING GLYCOPOLYMER AND A METHOD FOR DECOMPOSING THE SAME

BACKGROUND OF THE INVENTION

1. Field of the Invention

The present invention relates to a polymeric compound containing a glycopolymer, in particular a glycopolymer which is readily decomposed and the resulting decomposition products are readily recycled. In particular, the present invention relates to a polymeric compound containing an glycopolymer having a saccharide component, such as an oligosaccharide, which exclusively contains glucopyranose rings.

2. Description of the Related Art

These days, not only industrial waste but also domestic waste has become a prime consideration due to environmental pollution. Various resins used for industrial materials are not readily degradable or recyclable, and investigation and development of disposal methods having minimal adverse effects on the environment or novel materials applicable to such methods are in demand.

Examples of conventional methods for disposing of waste plastic having less adverse effects include a process comprising the steps of decomposing waste plastic into low-molecular compounds thermally or chemically, and then incinerating or burying the low-molecular compounds. However, incineration may contribute to earth warming, since it is accompanied by carbon dioxide discharge or causes air pollution if the resins contain halogens, sulfur, or nitrogen. When buried, almost all resins practically used at the present time remain unchanged for long time-periods during which additives and the like disperse from the resins, thereby causing soil pollution.

Concerning the above problems, biodegradable polymeric compounds having few adverse effects on the earth's environment at the time of final disposal have actively been under development (e.g., Japanese Unexamined Patent Publication No. 5-287043). Biodegradable resins are generally classified into three types, i.e., (1) microorganism products, (2) natural products derived from plants, and (3) chemically synthesized products. An example of a microorganism product which is commercially available is "BIOPOLE" (Trade name) manufactured by MONSANTO Co. Ltd. "BIOPOLE" is a copolymerized polyester of D-3-hydroxybutylate and D-3-hydroxyvalerate derived from Alcaligenes Eutroplus, i.e., hydrogen bacteria and is biodegradable by microorganisms. Examples of natural products ar collagen, gelatin, starch, cellulose, and chitosan. These natural products per se are biodegradable. A mixture of starch and modified polyvinyl alcohol, a cellulose ester obtained by chemical modification of cellulose, and a complex of cellulose and chitosan are typical natural products. Examples of chemically synthesized biodegradable products are: water-soluble polymers such as polyvinyl alcohol and polyethylene glycol; and aliphatic polyesters such as polyethylene adipate and polycaprolactam.

Meanwhile, for efficient use of resources, waste plastic is decomposed into low-molecular weight compounds. The low molecular-weight decomposition products can be recycled as a starting material for forming polymeric compounds. For example, polystyrene is catalytically decomposed using a solid base catalyst and recovered as a styrene monomer or dimer and is supplied as a recycled material for polymerization into polystyrene. In another example, polyethylene terephthalate is decomposed to dimethyl terephthalate, ethylene glycol, or terephthalic acid by (1) methanolysis using methanol, (2) glycolysis using ethylene glycol, or (3) hydrolysis using an acid or base, respectively. These decomposition products can then be utilized as a starting material for synthesizing polyethylene terephthalate or other chemicals. However, according to the above examples, numerous purification steps are necessary to obtain recyclable components from the decomposition products. Such numerous steps increase the cost of recycling the decomposition products of waste plastic.

Although the above-mentioned biodegradable polymeric compounds are preferable when disposing by burying them as compared with conventional non-biodegradable resins such as polyethylene, polypropylene, and polyvinyl chloride, biodegradable polymeric compounds have never been known up to now which are synthesized with a view toward recycling their decomposition products.

A polymeric compound containing a saccharide, that is, a glycopolymer, which is synthesized by polymerization is described in detail, for example, in "High Polymers, Japan" (Vol. 45 (August), page 553 to 557, 1996). A glycopolymer synthesized by copolymerizing (a main-chain type) sucrose and a diester of adipic acid using an enzyme catalyst is described by D. R. Patil et al. in Table 1 on page 554 and from line 11 to 13 in the left column on page 555 of the above Journal. Furthermore, it is reported that this glycopolymer contains approximately 30 sucrose molecules, is decomposed by heat at approximately 150° C., and is biodegradable in Macromolecules (D. R. Patil et al., Vol. 24, page 3462, 1991) and Biotechnology and Bioengineering (D. R. Patil et al., Vol. 37, page 639 to 646, 1991). However, the above literature does not disclose any glycopolymer in which an oligosaccharide exclusively having glucopyranose rings composes the main chain with a second component nor is ther any description suggesting that a biodegradable polymeric compound having excellent heat stability is obtained from the above compound.

SUMMARY OF THE INVENTION

Accordingly, it is an object of the present invention to provide a decomposable polymeric compound of which decomposition products can be readily recycled and a method for decomposing such polymeric compound.

According to a first aspect of the present invention, there is provided a glycopolymer, wherein the glycopolymer comprises a saccharide component consisting of glucopyranose and a second component.

According to a second aspect of the present invention there is provided a glycopolymer comprising a main chain of a saccharide component and a second component, wherein said saccharide component consists of glucopyranose.

According to another aspect of the present invention, there is provided a glycopolymer containing a plurality of molecular chains, each said molecular chain containing at least one repeating unit wherein said molecular chains are crosslinked with a saccharide crosslinking component, said saccharide crosslinking component consisting of glucopyranose.

According to another aspect of the present invention, there is provided a method for decomposing a glycopolymer which comprises a saccharide consisting of glucopyranose and a second component wherein the method comprises the steps of selectively decomposing a bond between the saccharide and the second component to decompose the glycopolymer.

According to a further aspect of the present invention there is provided a method for decomposing a glycopolymer containing a plurality of molecular chains, each said chain containing at least one repeating unit, wherein said molecular chains are crosslinked with a saccharide crosslinking component, said saccharide component consisting of glucopyranose, said method comprising selectively decomposing a bond between the molecular chains and the saccharide crosslinking component.

As a result of further study on polymeric compounds containing a saccharide, the present inventors have found the following facts and achieved the present invention: a glycopolymer which has an oligosaccharide containing glucopyranose rings is excellent in resin characteristics, is decomposed by an enzyme, and the decomposition products thereof are controllable.

BRIEF DESCRIPTION OF THE DRAWINGS

FIGS. 1A and 1B are schematic views of a first embodiment of a glycopolymer of the present invention;

FIG. 2 is a schematic view of a second embodiment of a glycopolymer of the present invention;

DETAILED DESCRIPTION OF THE PREFERRED EMBODIMENTS

Figure 3:
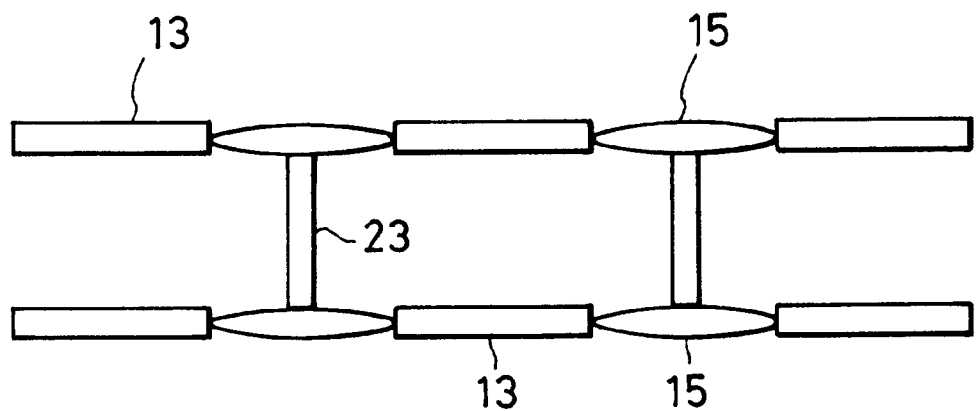
FIG. 3 is a schematic view of an another embodiment of a glycopolymer of the present invention.

The present invention will be explained in detail with reference to the accompanying drawings.

The First Embodiment

FIG. 1A illustrates the concept of a linear glycopolymer of the first embodiment and FIG. 1B explains the concept of decomposition of the linear glycopolymer of FIG. 1A. In FIG. 1A, oligosaccharide portions 11 and second-component portions 13 are linked to form the main chain of the glycopolymer. For example, each of the saccharide portions 11 and the second-component portions 13 are linked by an ester bond.

In general, one oligosaccharide molecule has 2 to 10 monosaccharide molecules. Oligosaccharides are classified into homo-oligosaccharides composed of one type of monosaccharide and hetero-oligosaccharides composed of not less than 2 types of monosaccharides, and both of these can be used as the oligosaccharide portions 11.

The oligosaccharide portions 11 contain a saccharide exclusively having glucopyranose rings, since heat resistance of the polymeric compound is improved by introducing the saccharide exclusively having glucopyranose rings to the oligosaccharide portion. Examples of typical oligosaccharide having only a glucopyranose ring as a heterocyclic ring are: disaccharides such as maltose, cellobiose, lactose, isomaltose, and chitotriose; trisaccharides such as cellotriose, maltotriose and chitotriose and tetrasaccharides and other oligosaccharides having more than 4 monosaccharides such as chitotetraose, cellotetraose, cellopentaose, chitopentaose, chitohexaose, maltotriose, maltopentaose, and cellohexaose. In addition, derivatives of the above saccharides may be used which are obtained by substituting the hydroxy groups contained in these saccharides with groups such as the acetyl and benzyl groups.

The second-component portions 13 are formed of a compound which can form, for example, a decomposable ester bond, urethane bond or peptide bond with the saccharide component. Such compounds can include dicarboxylic acids, diamines, diols, diisocyanates and the like. Typical diamines include alkylenediamines, such as lower $C_2$–$C_8$ alkylenediamines, especially ethylene diamine, tetramethylene diamine and hexamethylene diamine. Typical diols include alkylene diols, such as lower $C_2$–$C_8$ alkylenediols, including 1,3-butane diol, 1,5-pentane diol, 1,4-butane diol and 1,6-hexamethylene diol. Typical isocyanates include, diisocyanates, such as tetramethylene diisocyanate, octamethylene diisocyanate and diphenyl methane diisocyanate.

The second-component portions 13 are preferably composed of a material which can form an ester bond with the hydroxy group of the above saccharide and can synthesize a linear polymer. Examples of such materials are: dicarboxylic acids including oxalic acid, malonic acid, succinic acid, glutaric acid, adipic acid, pimelic acid, suberic acid, azelaic acid, and sebacic acid; salts thereof; and derivatives thereof.

The main chain of the glycopolymer shown in FIG. 1A can be synthesized by polymerizing the OH group of the above saccharide and the COOH or the COCl group of the carboxylic acid using an ester bond or by ester interchange between a dicarboxylate and an oligosaccharide.

Decomposition of glycopolymers having the structure shown in FIG. 1A will be explained below. A glycopolymer shown in FIG. 1A can be decomposed into oligosaccharide and a second component by applying an enzyme which decomposes bonds between the oligosaccharide portions 11 and the second-component portions 13. In practice, when esterase- or lipase-catalyzing ester hydrolysis acts on a glycopolymer composed of an oligosaccharide and a dicarboxylic acid, the ester bonds between the oligosaccharide portions 11 and the second-component portions 13 (i.e. the dicarboxylic acid) are hydrolyzed so that oligosaccharide and dicarboxylic acid are obtained as decomposition products, as is shown in FIG. 1B. Since the oligosaccharide portions 11 and the second-component portions 13 are regularly arranged in a glycopolymer in FIG. 1A, the molecular weights of the resulting products, i.e., oligosaccharide or dicarboxylic acid, do not greatly differ from each other. Therefore, the decomposition products can be recycled without any purification step or with simple purification of oligosaccharide or dicarboxylic acid, resulting in a large reduction in cost of recycling such decomposition products.

In the above embodiment, the bond between the oligosaccharide portion 11 and the second-component portion 13 is not restricted to the ester bond. Any bond can be used, so long as it can be selectively decomposed by an enzyme. Typical examples of such bonds are peptide bonds and urethane bonds.

For example, by using a saccharic acid (e.g., D-glucuronyl-β-1,2-D-glucuronic acid) as the oligosaccharide and an amine (e.g., tetramethylenediamine) as the second component, a linear glycopolymer in which a oligosaccharide portion and a second-component portion are linked by a peptide bond can be obtained.

Furthermore, the oligosaccharide portion and the second-component portion can be linked by a chemical bond other than the ester bond by introducing a polymerizable functional group, such as the amido or urethane group, into at least the oligosaccharide portion or the second-component portion.

For decomposing a glycopolymer in which an oligosaccharide portion and a second-component portion are linked by a peptide bond, at least one enzyme selected from the following can be used as an endopeptidase: chymotrypsin, Staphylococcus protease, Streptomyces griseus protease, subtilisin, trypsin, serine protease, pronase, thiol protease, thermolysin, collagenase, Armillarimellea protease, and carboxyl protease. As an exopeptidase, at least one enzyme selected from the following can also be used: aminopeptidase, aminopeptidase M, pyrrolidonyl peptidase and leucine aminopeptidase.

When an oligosaccharide portion and a second-component portion are linked by a urethane bond, the glycopolymer can be decomposed by amidase, ligase, and lyase.

The weight-average molecular weight of the glycopolymers is, preferably, from 1,000 to 1,000,000, and, more preferably, from 2,000 to 200,000.

The oligosaccharide portions 11 and the second-component portions 13 may be directly linked or linked through crosslinking agents or various functional substances (e.g., compounds having photochromic characteristics, photodecomposition characteristics, or non-linear optical effects). Furthermore, when the glycopolymers acquire a predetermined strength by adding additives such as pigments, plasticizers, and fillers, they can be employed in various structural materials and the like.

The Second Embodiment

In FIGS. 2 and 3, there are shown oligosaccharide or polysaccharide portions 15. The oligosaccharide or polysaccharide portions 15 and second-component portions 13 are linked by enzyme decomposable bonds, such as ester bonds, and form the main chain of the glycopolymer.

In FIG. 3, a crosslinking site 23 is provided, which crosslinks main chains, wherein the main chains consist of the oligosaccharide or polysaccharide portions 15 and the second-component portions 13.

A glycopolymer of the second embodiment can be prepared as follows: an oligosaccharide or polysaccharide having at least three reactive sites to a second component composing the second-component portions 13 is used as the oligosaccharide or polysaccharide portions 15 and is subjected to reaction with a dicarboxylic acid or the like which is employed as the second component. Examples of such a oligosaccharide are those having 3 to 10 monosaccharide molecules. Examples of such a polysaccharide are chitosan, alginic acid, cellulose, starch, glycogen, galactan, mannan, and polyglucosamine.

The oligosaccharide or polysaccharide portions 15 contain a saccharide exclusively having glucopyranose rings so as to improve heat resistance of the resulting polymeric compound, as is mentioned in the first embodiment.

A glycopolymer shown in FIG. 2 or FIG. 3 can also be synthesized as follows: the hydroxy groups in saccharide portions of a linear glycopolymer, which is composed of a dicarboxylic acid and an oligosaccharide (e.g., cellobiose) having two monosaccharide molecules, are esterified by a reaction with adipic acid in pyridine or dimethylformamide (hereinafter referred to as DMF) so as to achieve crosslinking by adipic acid.

It is preferable to synthesize the glycopolymer shown in FIG. 3 by providing the main chain consisting of the oligosaccharide or polysaccharide portions 15 and the second-component portions 13, and then crosslinking the main chain with a crosslinking agent.

Typical examples of suitable crosslinking agents include aliphatic compounds having two or more functional groups capable of reacting with the OH-group or COOH-group in the oligosaccharide of polysaccharide portions 15. Such crosslinking agents include dicarboxylic acids, diols, diisocyanates, diamines or polyvinyl alcohol and the like.

A glycopolymer having a structure shown in FIGS. 2 and 3 in which the oligosaccharide and the second component are linked by peptide bonds can be obtained when a saccharic acid such as alginic acid is used for preparing the oligosaccharide portions 15 and a diamine such as hexamethylenediamine is employed as the second component.

Such a glycopolymer can be decomposed by an enzyme acting on bonds between the oligosaccharide or polysaccharide portions 15 and the second-component portions 13, as is similar to the first embodiment. Furthermore, the resulting decomposition products can be recycled without any purification step or with a simpler purification step as compared with conventional methods, thereby greatly reducing the cost of recycling such decomposition products.

The Third Embodiment

Figure 4:
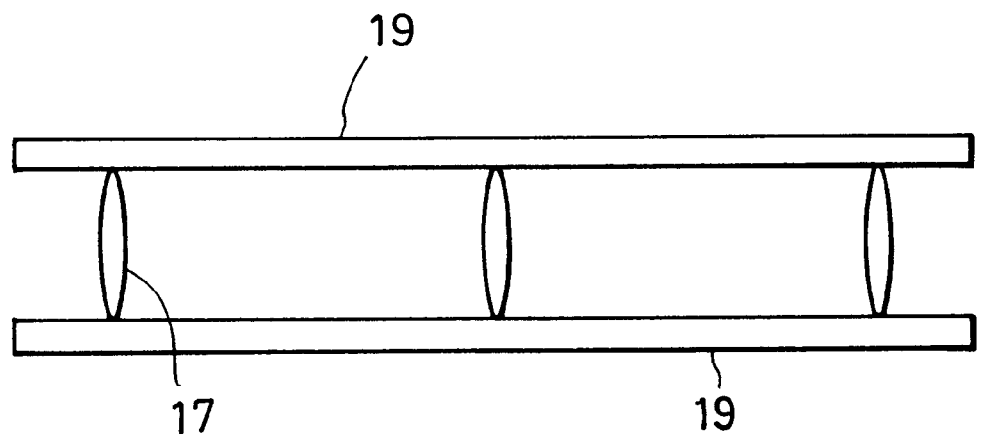
FIG. 4 is a schematic view of yet another glycopolymer of the present invention.

In FIG. 4, there are shown oligosaccharide or polysaccharide portions 17 and second components 19 formed in molecular chains.

The second components 19 formed in molecular chains are crosslinked by the oligosaccharide or polysaccharide portions 17.

An oligosaccharide or a polysaccharide which can be used for the oligosaccharide portions 11 of the first embodiment or the polysaccharide portions 15 of the second embodiment, respectively, can be applied to the oligosaccharide or polysaccharide portions 17 of this embodiment.

The oligosaccharide or polysaccharide portions 17 contain a saccharide exclusively having glucopyranose rings so as to improve heat resistance of the polymeric compound, as is similar to the first and second embodiments. For the second component 19, a compound which has functional groups capable of reacting with the —OH group in the saccharide component is employed. Typical second components can form decomposable ester, urethane and/or peptide bonds with the saccharide component 17 and include polymerizable carboxylic acids, amines, alcohols and the like.

As the preferred second component 19, a molecular chain containing at least one repeating unit, such as a repeating unit derived from a compound having vinyl group, and containing a plurality of function groups capable of reacting with OH-group in saccharide, is preferable. Examples of such a molecular chain includes a molecular chain consisting of polyacrylic acid and the like.

In case that cellobiose and polyacrylic acid are employed as the oligosaccharide 17 and the material for the second-component portion 19, respectively, a glycopolymer comprising a second-component portion 19 bonded with oligosaccharide 17 by an ester bond can be obtained.

The bond between the oligosaccharide portion 17 and the second-component portion 19 is not restricted to the ester bond, and any bond such as a peptide bond, or a urethane bond, can be used, so long as it can be decomposed by an enzyme.

Figure 5:
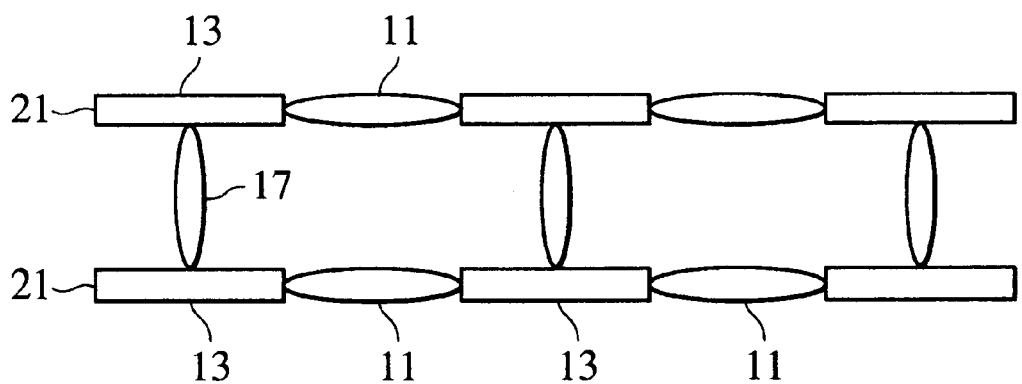
FIG. 5 is a schematic view for showing another embodiment of a glycopolymer of the present invention.

A glycopolymer shown in FIG. 5 is different from that shown in FIG. 4 in that molecular chains 21 of FIG. 5 are composed of saccharide portions 11 and second-component portions 13 which are linked together, instead of the molecular chain of the second-component portion 19 in FIG. 4. For example, the glycopolymer synthesized according to the method described in the first embodiment can be employed as the molecular chain 21. As the second-component 13, however, a material having a functional group which can be crosslinked by the oligosaccharide or polysaccharide portions 17 is preferably used. Examples of materials for the second-component portion 13 include tricarboxylic acids such as aconitic acid and salts thereof. Where a tricarboxylic acid is employed for the second-component portions 13 and an oligosaccharide such as cellobiose is employed for the oligosaccharide portions 17 crosslinking the molecular chains 21, and for the saccharide portions 11, a glycopolymer in which each bond between the saccharide portions 11 and the second-component portions 13 in the molecular chain 21, and between the oligosaccharide portions 17 and the molecular chains 21 is an ester bond, can be obtained. However, the crosslinks between the oligosaccharide or polysaccharide portions 17 and the molecular chains 21 are not restricted to the ester bonds, and any bond such as a peptide bond, or a urethane bond, can be used, as long as they can be decomposed by an enzyme.

The glycopolymers illustrated in FIGS. 4 and 5 can be decomposed by an enzyme acting on the bonds between the molecular chains of the second component 19 or the molecular chains 21 and the oligosaccharide or polysaccharide portions 17 crosslinking the molecular chains, as is similar to the first and second embodiments. Therefore, the resulting decomposition products can be recycled without purification step or with a simpler purification step as compared with conventional methods, thereby greatly reducing cost of recycling such decomposition products.

Figure 6:
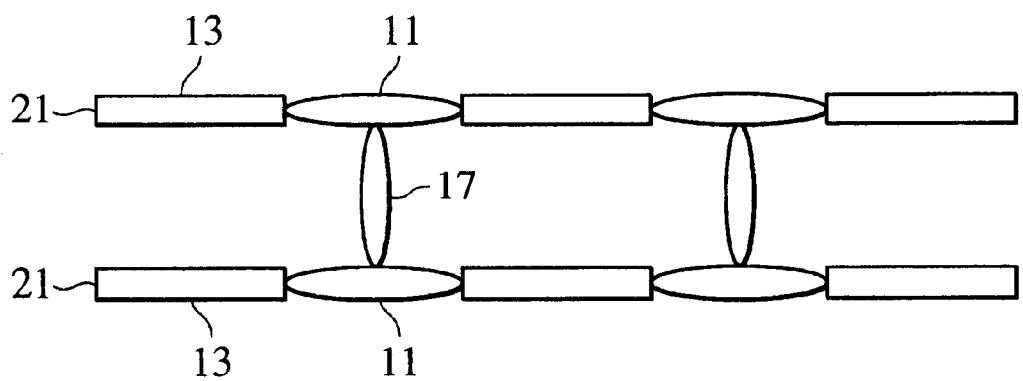
FIG. 6 is a schematic view of another embodiment of a glycopolymer of the present invention.

A glycopolymer shown in FIG. 6 is different from that shown in FIG. 5 in that molecular chains 21 of FIG. 6 are crosslinked such that oligosaccharide portions 11 in one molecular chain 21 and those in the other molecular chain 21 are crosslinked by oligosaccharide or polysaccharide portions 17. The glycopolymer shown in FIG. 6 can be prepared as follows: For example, it is preferred to employ as oligosaccharide portion 11, an oligosaccharide, which is composed of two monosaccharide molecules (e.g., cellobiose or maltose), which has two reactive sites polymerizable with second-component portions 13 and another site reactive to a crosslinking agent. The oligosaccharide 11 is reacted with a material (e.g., a dicarboxylic acid) composing the second-component portions 13 so as to synthesize a straight glycopolymer (the molecular chain 21) composed of the oligosaccharide and the second-component.

The resulting molecular chains 21 are then crosslinked at hydroxy groups or carboxylic groups in the oligosaccharide 11 in the main chain using an oligosaccharide composed of two monosaccharide molecules or a polysaccharide as a crosslinking agent 17. The crosslinks between the oligosaccharide or polysaccharide portions 17 and the molecular chains 21 are not restricted to ester bonds, and any bond such as a peptide bond, or a urethane bond can be used, so far as it can be decomposed by an enzyme.

Figure 7:
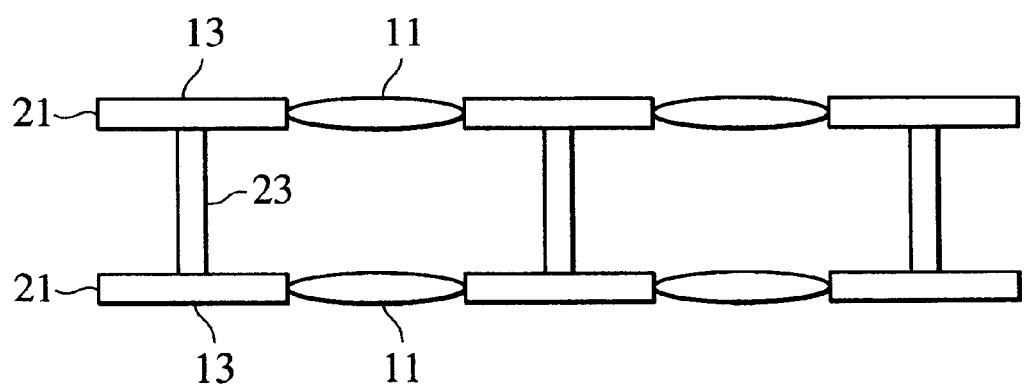
FIG. 7 is a schematic view of another embodiment of a glycopolymer of the present invention.

The glycopolymer of FIG. 7 is different from that of FIG. 5 in that crosslinking portions 23 crosslinking two molecular chains 21 do not contain saccharide. The glycopolymer of FIG. 7 can be obtained by employing a similar method to that for synthesizing the glycopolymer of FIG. 5. Specifically, the glycopolymer having the above structure can be prepared by employing a process comprising the steps of reacting oligosaccharide with an excessive quantity of tricarboxylic acid, followed by adding a crosslinking component such as polyvinyl alcohol.

Furthermore, a glycopolymer in which the molecular chains and the crosslinking-component portions are linked by urethane bonds can be obtained by reaction of an oligosaccharide, polysaccharide, acetylated oligosaccharide, or acetylated polysaccharide with an excessive quantity of isocyanic acid or an ester thereof, followed by reaction with a polyvinyl alcohol.

The glycopolymers incorporated in the above embodiments can be used alone or in combination with additives such as conventional pigments, plasticizers, and fillers, if required.

As is described above, an enzyme-decomposable polymeric compound can be obtained according to the present invention.

Since the resulting decomposition products of the instant glycopolymer of the present invention have homogeneous compositions, they can be recycled without complicated purification steps, resulting in a great reduction in cost of recycling the decomposition products. Practical examples of the present invention will be described below. These examples illustrate certain preferred embodiments and are not limitative of scope.

EXAMPLE 1

A glycopolymer having the structure shown in FIG. 1A was synthesized according to the following method:

Cellobiose, i.e., an oligosaccharide derived from cellulose, was employed as the oligosaccharide having glucopyranose rings.

Using 0.05 to 0.2 mol of potassium carbonate as a catalyst, 1 mol of cellobiose was subjected to reaction in dimethyl formamide (DMF) with 1 mol of dimethyl adipate. The reaction was carried out for 3 hours at 80 to 100° C. under a pressure of not more than 100 mmHg. Methanol, i.e., a by-product of the reaction, was removed. A solid substance insoluble in water was isolated from the resulting reaction product. Measurement using gel permeation chromatography (hereinafter referred to as "GPC") revealed that the solid substance was a polymeric compound having a weight-average molecular weight (hereinafter referred to as "Mw") from 50,000 to 150,000 (converted to polyethylene glycol). The polymeric compound weight was measured employing two PL MIXED-D columns (manufactured by Polymer Laboratories) with DMF as an eluent.

Figure 8:
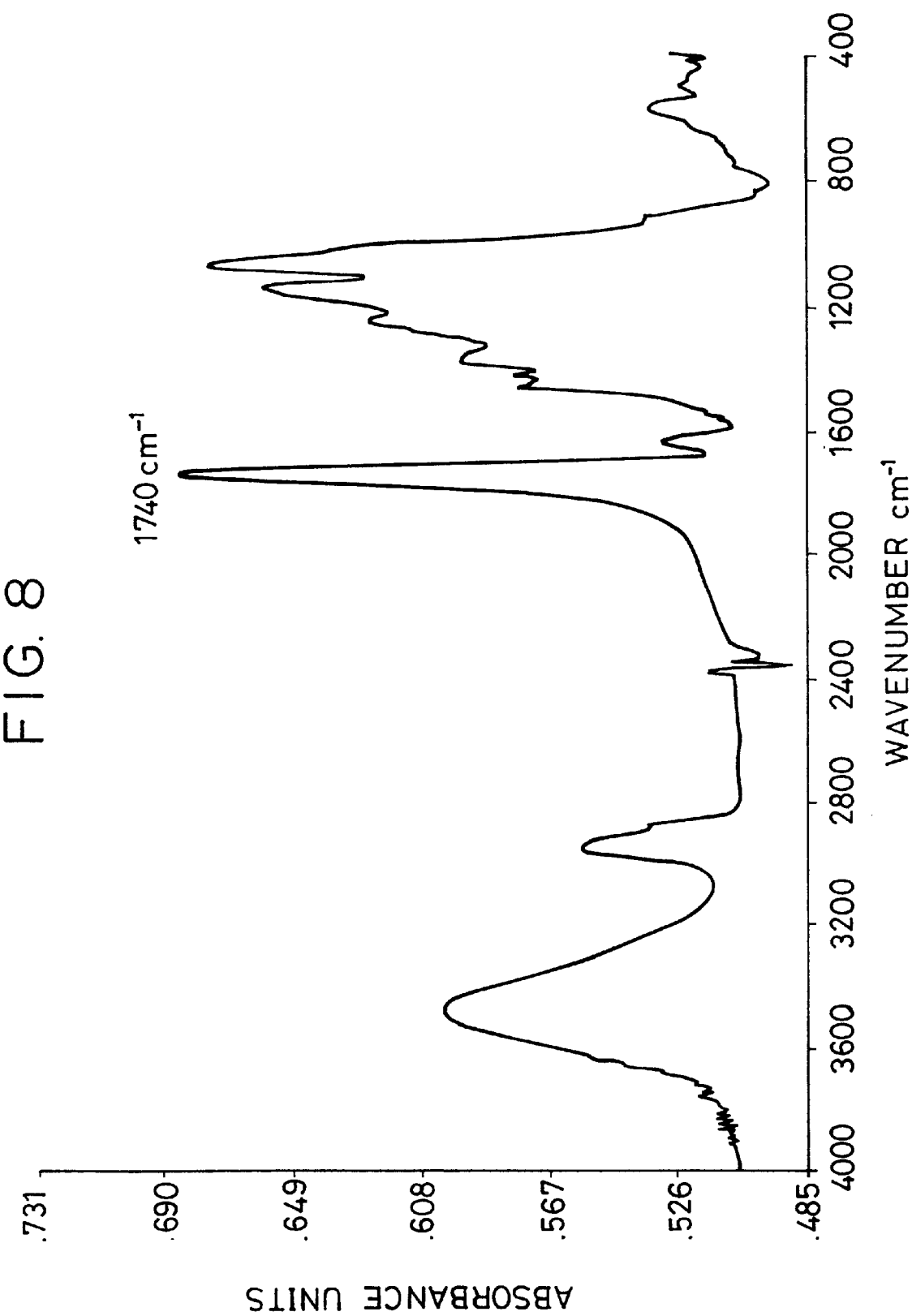
FIG. 8 shows an infrared absorption spectrum of the glycopolymer of Example 1.

The resulting polymeric compound was then subjected to the infrared absorption spectroscopy. An absorption peak due to the C=O bond in ester bonds is observed at approximately 1740 cm$^{-1}$ as is shown in FIG. 8. In addition, the NMR spectrum of the resulting polymeric compound apparently indicated that esterification occurred mainly in the 6-position of glucopyranose rings in cellobiose.

From the above results, it was assumed that the polymeric compound synthesized in this example was a linear-chain polymer in which cellobiose and dimethyl adipate were alternately polymerized to form a main chain containing an oligosaccharide derived from cellobiose.

EXAMPLES 2 to 5

Polymeric compounds were synthesized according to the same method as in Example 1, except that the type of oligosaccharide and the reaction conditions were changed as shown in Table 1.

Each resulting polymeric compound exhibited similar infrared absorption spectrum characteristics to those in Example 1. In addition, the NMR spectrum of each resulting polymeric compound revealed that esterification occurred mainly in the 6-position of glucopyranose rings in the oligosaccharide.

TABLE 1

| Example No. | Oligosaccharide | Dimethyl adipate (mol) | Catalyst (mol) | Reaction Temp. (° C.) | Reaction time (hours) |
|---|---|---|---|---|---|
| 2 | Cellotriose | 1 | 0.05 | ≦80 | 8 |
| 3 | Cellotetraose | 0.8 | 0.1 | ≦90 | 24 |
| 4 | Cellopentaose | 1.2 | 0.1 | ≦90 | 48 |
| 5 | Cellohexaose | 1.5 | 0.2 | ≦100 | 48 |

Note: the quantities of dimethyl adipate are shown by their ratios in relation to 1 mol of oligosaccharide.

EXAMPLES 6 to 10

Polymeric compounds each incorporated in Examples 6 to 10 were synthesized according to the same method as in Examples 1 to 5, except that dimethyl pimelate was employed instead of dimethyl adipate and the reaction conditions were changed as shown in Table 2. Each resulting polymeric compound exhibited similar infrared absorption spectrum characteristics to those in Example 1. In addition, the NMR spectrum of each resulting polymeric compound revealed that esterification occurred mainly in the 6-position of glucopyranose rings in the oligosaccharide.

TABLE 2

| Example No. | Oligosaccharide | Dimethyl primelate (mol) | Catalyst (mol) | Reaction Temp. (° C.) | Reaction time (hours) |
|---|---|---|---|---|---|
| 6 | Cellobiose | 1.0 | 0.05 | ≦80 | 5 |
| 7 | Cellotriose | 1.0 | 0.1 | ≦80 | 10 |
| 8 | Cellotetraose | 1.2 | 0.08 | ≦90 | 20 |

TABLE 2-continued

| Example No. | Oligosaccharide | Dimethyl primelate (mol) | Catalyst (mol) | Reaction Temp. (° C.) | Reaction time (hours) |
|---|---|---|---|---|---|
| 9 | Cellopentaose | 1.2 | 0.15 | ≦90 | 40 |
| 10 | Cellohexaose | 1.5 | 0.2 | ≦100 | 48 |

Note: the quantities of dimethyl pimelate are shown by their ratios in relation to 1 mol of oligosaccharide.

EXAMPLE 11

A glycopolymer having the schematic structure shown in FIG. 1A was synthesized according to the following method:

A DMF solution containing 4.5 g of terephthalic acid dichloride and 2.7 g of dimethylaminopyridine was added dropwise to a dioxane solution containing 5 g of cellobiose, followed by stirring for 22 hours at 60° C. to form a reaction solid. The resulting solid was washed with ethanol and then separated into a water-soluble substance and a water-insoluble substance. The Mw of the polymeric compound isolated from the water-insoluble substance using DMF was approximately $10^3$ to $10^5$ and that of the water-soluble substance was 100 to 1,000.

Figure 9:
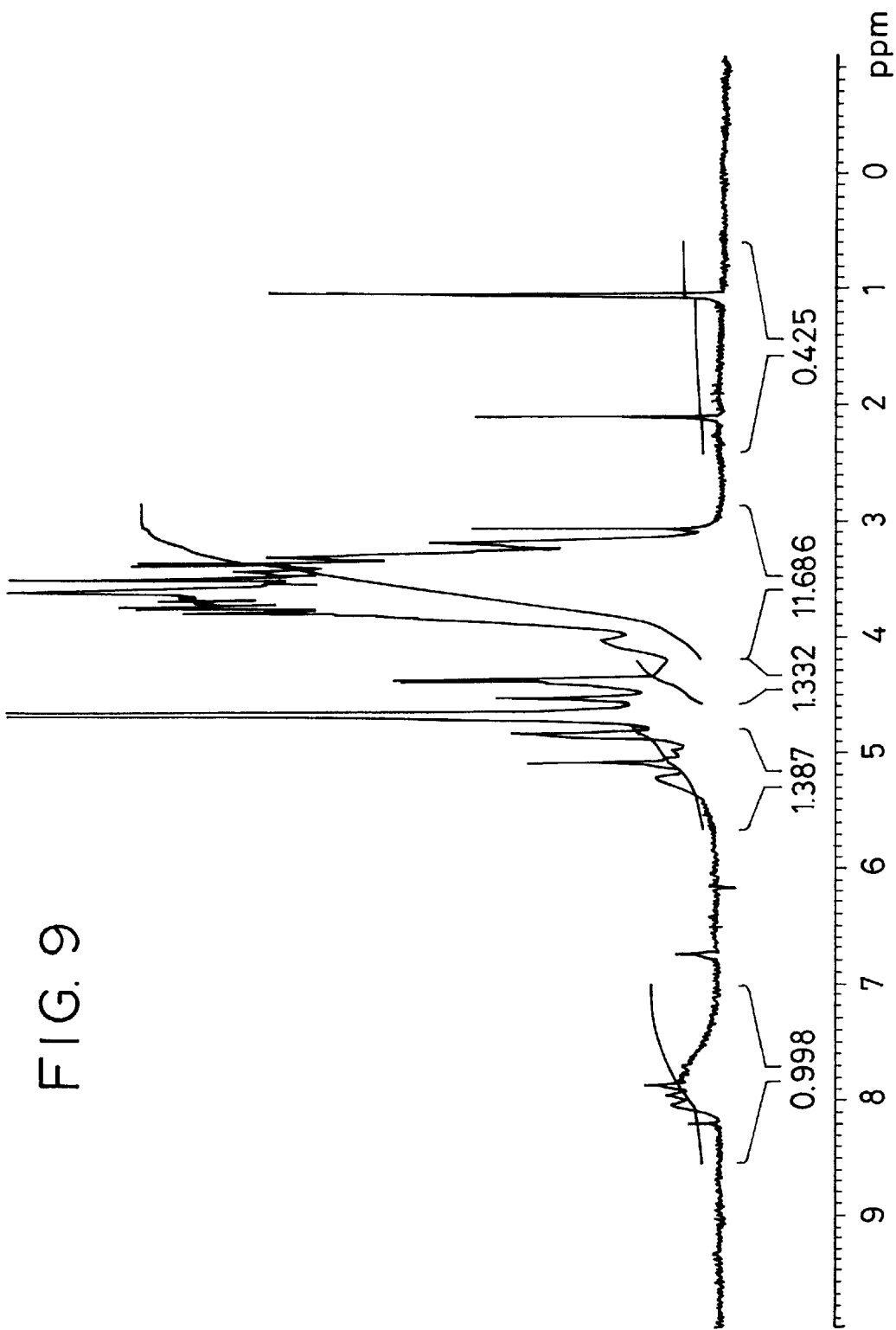
FIG. 9 shows a NMR spectrum of the water-soluble substance obtained from the glycopolymer of Example 11.
Figure 10:
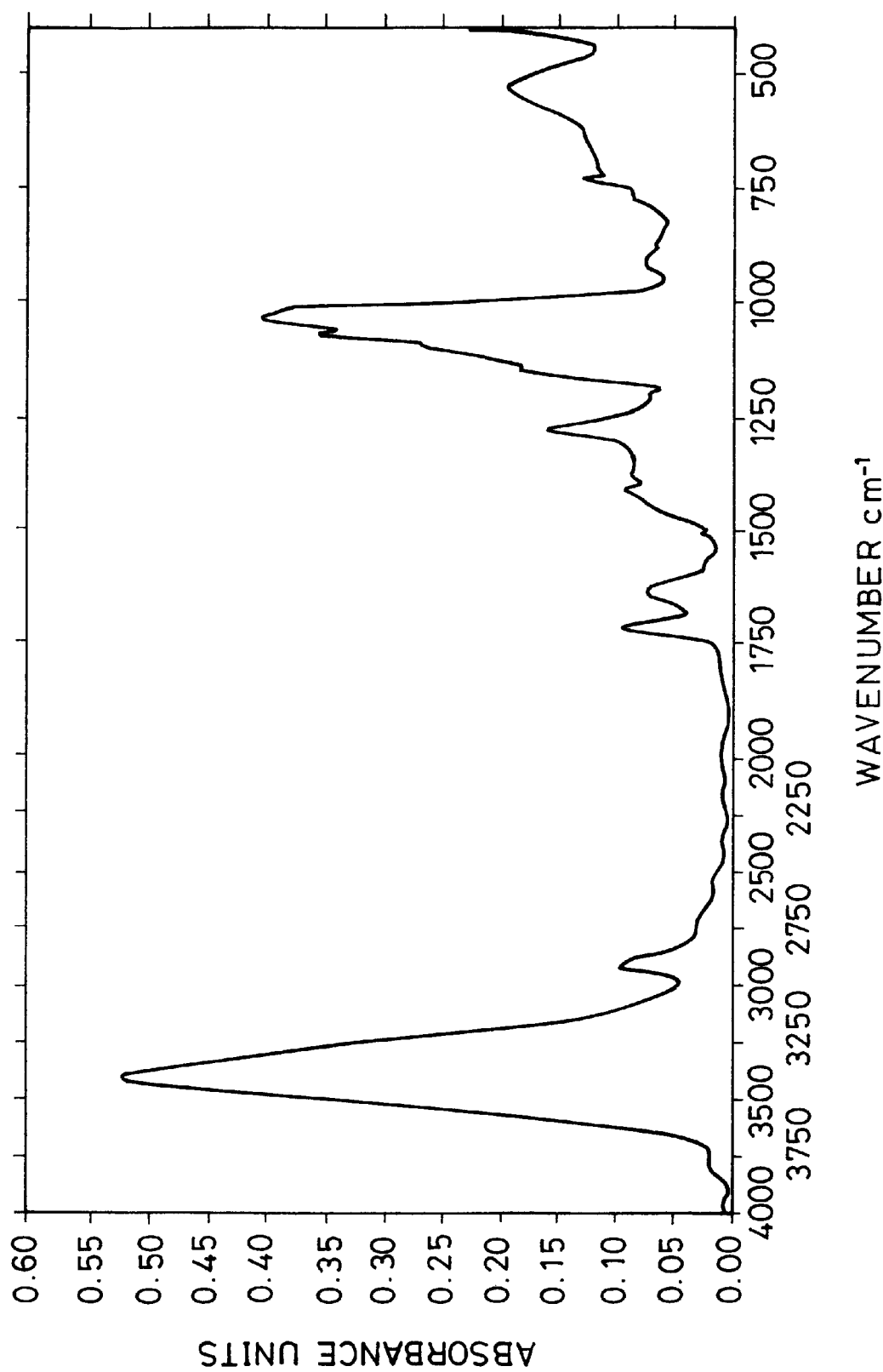
FIG. 10 shows an infrared absorption spectrum of the water-soluble substance obtained from the glycopolymer of Example 11.

FIG. 9 shows the NMR spectrum (heavy-water solvent) of the water-soluble substance and FIG. 10 shows the infrared absorption spectrum. It is understood from these spectra that the primary OH group in cellobiose mainly participates in the reaction.

Figure 11:
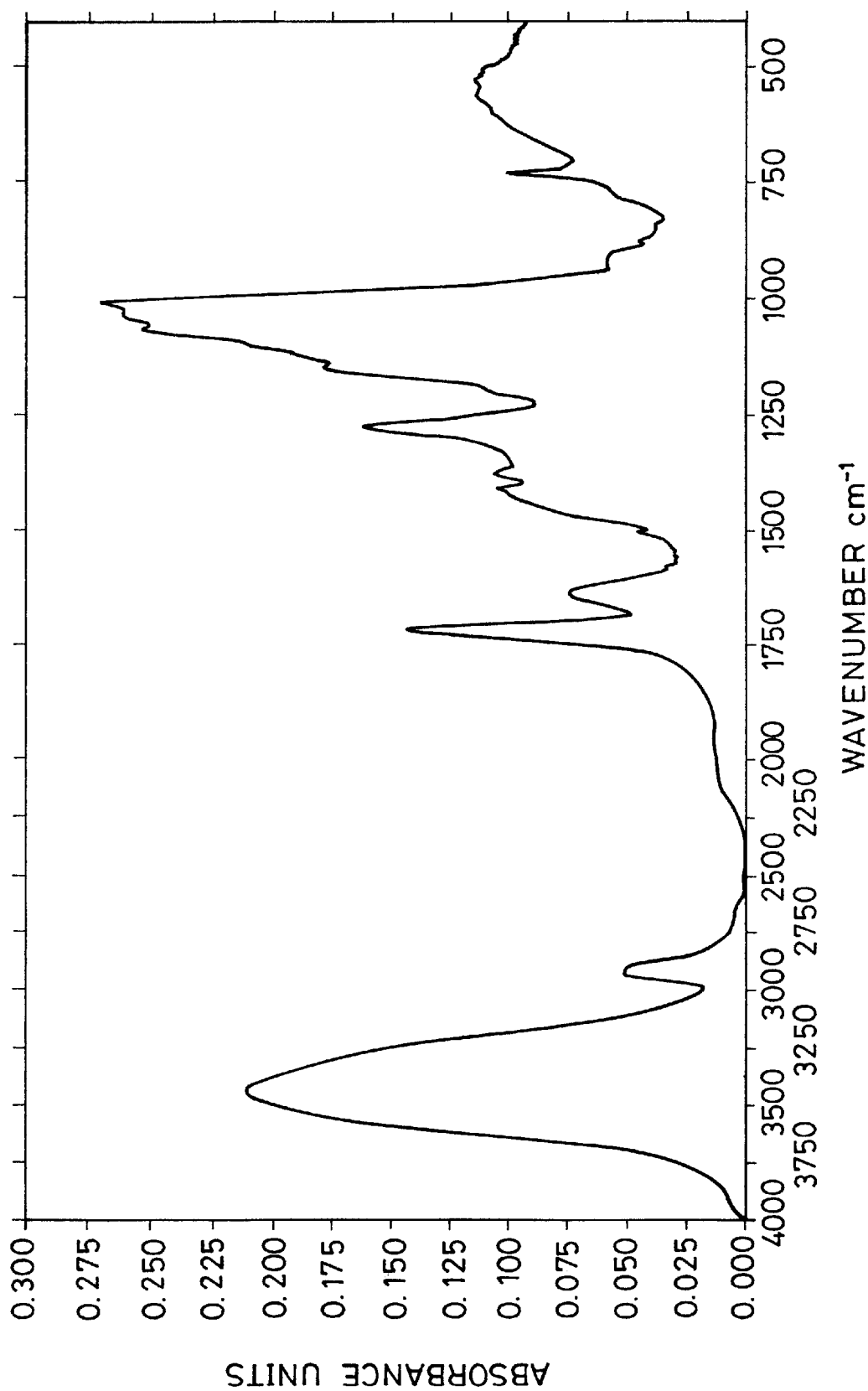
FIG. 11 shows an infrared absorption spectrum of the water-insoluble substance obtained from the glycopolymer of Example 11.
Figure 12:
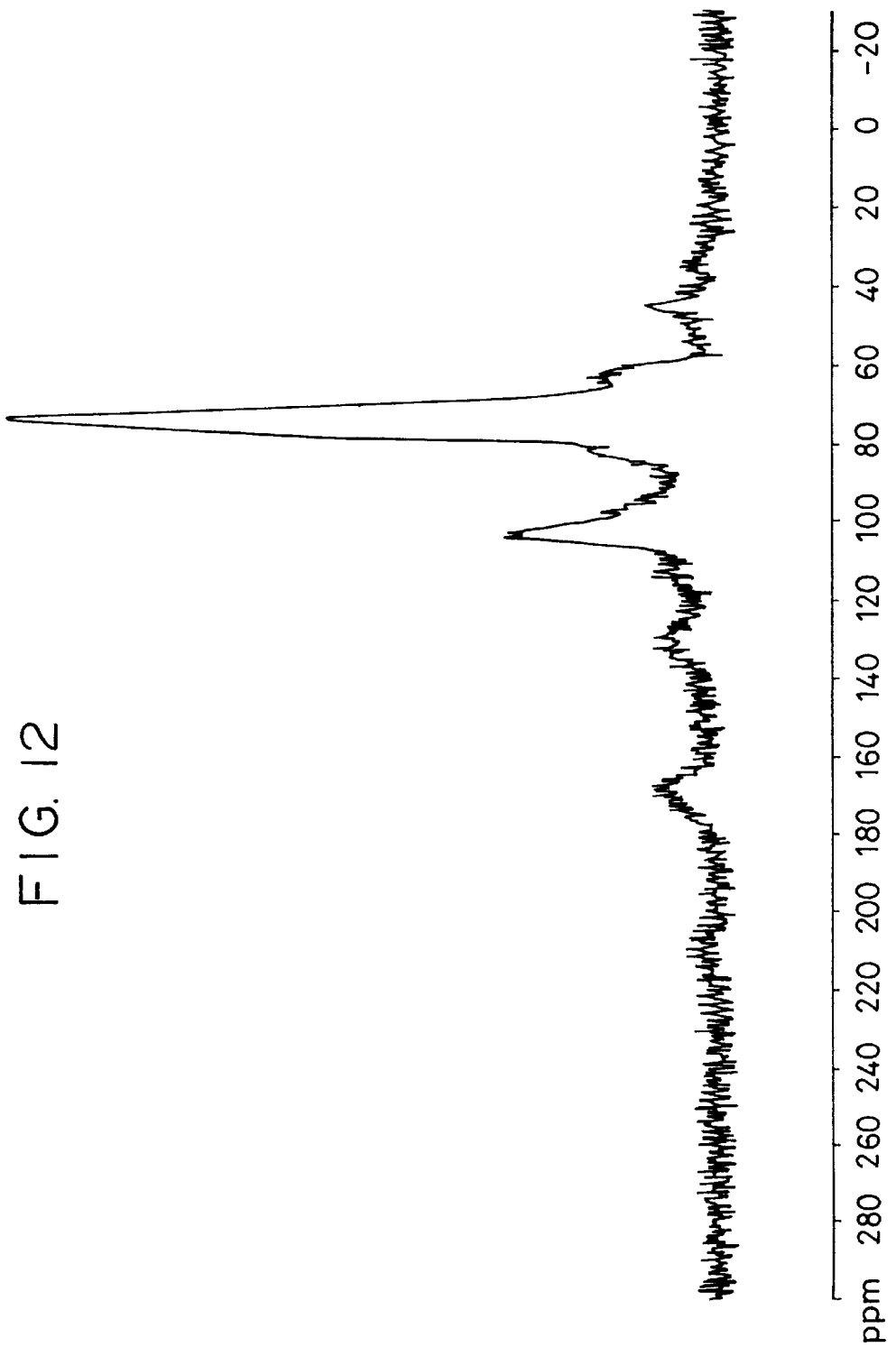
FIG. 12 shows a solid NMR spectrum of the water-insoluble substance obtained from the glycopolymer of Example 11.

FIG. 11 shows the infrared absorption spectrum of the water-insoluble substance and FIG. 12 shows the solid NMR spectrum. Although the infrared absorption spectrum of the water-insoluble substance shown in FIG. 11 is similar to that of the water-soluble substance shown in FIG. 10, the peak intensity due to the C=O bond in ester is increased in the spectrum of FIG. 11. Therefore, it is understood that the water-insoluble substance is more polymerized as compared with the water-soluble substance. The solid NMR spectrum shown in FIG. 12 also confirms the esterification.

Figure 13:
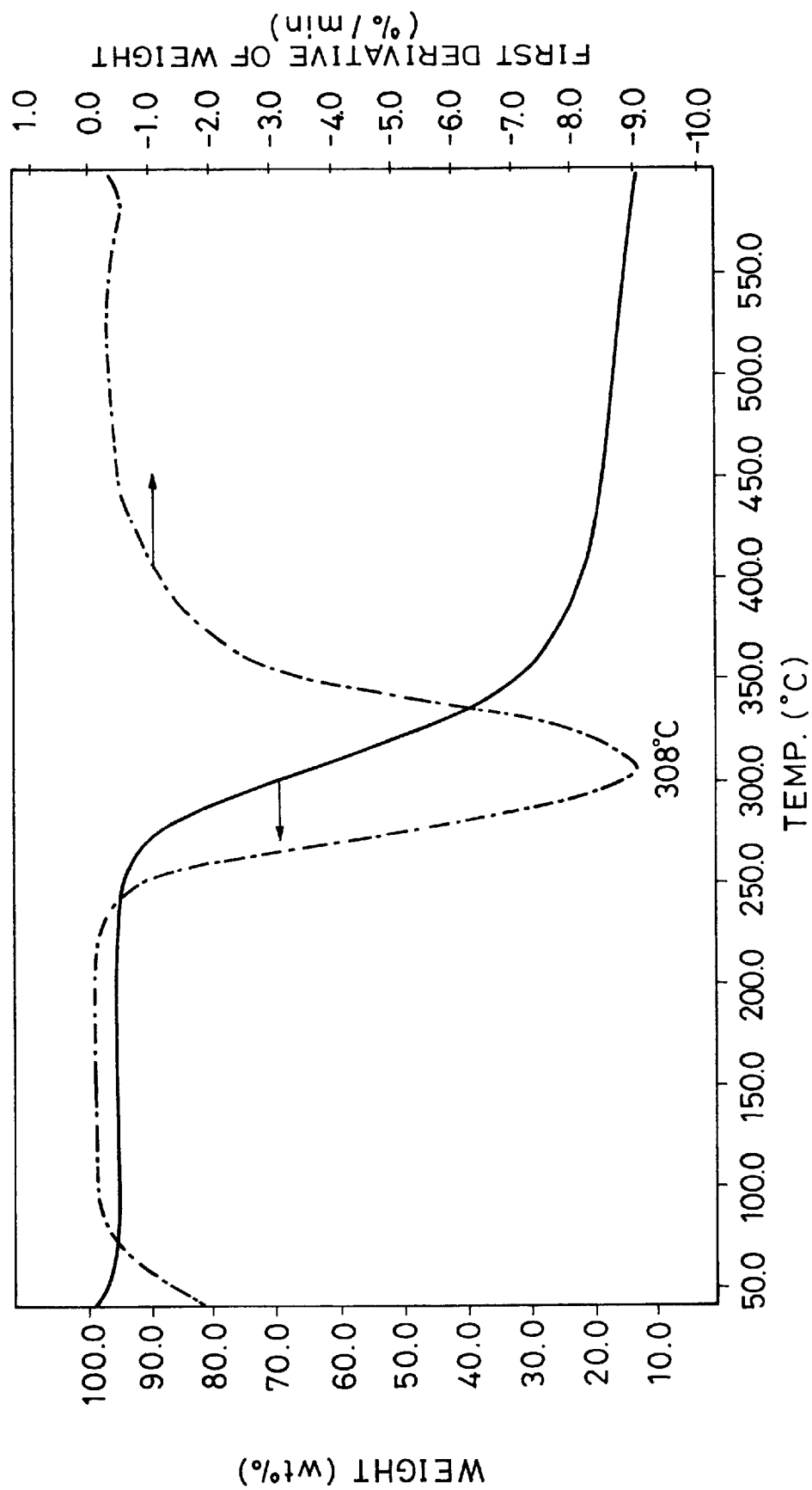
FIG. 13 shows the result of a thermogravimetric analysis of the water-insoluble substance obtained from the glycopolymer of Example 11.

FIG. 13 shows the result of a thermogravimetric analysis of the water-insoluble substance. As is apparent from FIG. 13, the decomposition temperature of the polymeric compound of this example is 308° C.

Glycopolymers containing glucofuranose rings and glucopyranose rings, for example, those described in the foregoing Macromolecules (D. R. Patil et al., vol 24, page 3462, 1991) and Biotechnology and Bioengineering (D. R. Patil et al., vol 37, page 639 to 646, 1991) are decomposed at 150° C. Therefore, the polymeric compound exclusively containing glucopyranose rings of the present invention apparently has superior heat resistance. In addition, the water-soluble substance exhibited almost the same heat decomposition characteristics to those of the water-insoluble substance.

EXAMPLE 12

A glycopolymer having the structure shown in FIG. 4 was synthesized according to the following method:

20 g of polyacrylic acid having an weight-average molecular weight of 2,000, 25.5 mmol of cellobiose, and 1.8 mmol of potassium hydroxide were added to DMF, followed by stirring for 5 hours at 90° C. under reduced pressure. The resulting reaction solid obtained by removing the DMF solvent had a Mw of not less than 10,000. The infrared absorption spectrum of the resulting solid revealed no absorption due to COOH at 1700 cm$^{-1}$, which absorption was observed in polyacrylic acid used as the reference material, and exhibited a new peak due to the ester bond at from 1720 to 1740 cm$^{-1}$. Therefore, it was confirmed that the resulting polymeric compound had a structure in which polyacrylic acid was crosslinked by cellobiose.

EXAMPLES 13 to 16

Polymeric compounds were synthesized according to the same method as in Example 12, except that cellotriose, cellotetraose, cellopentaose, and cellohexaose were respectively employed instead of cellobiose. The infrared absorption spectrum of each resulting polymeric compound exhibited no peak for carboxylic acid and showed a new peak for the ester bond. Therefore, it was confirmed that the resulting polymeric compounds had structures in which polyacrylic acid was crosslinked by cellotriose, cellotetraose, cellopentaose, or cellohexaose.

EXAMPLE 17

A condensate of cellobiose and a triester of aconitic acid, as is shown schematically in FIG. 5, was prepared by ester interchange using trimethyl aconitate (trans-form) with cellobiose as an oligosaccharide.

In other words, 1 mol of cellobiose, 1.5 mol of trimethyl aconitate, and 0.05 mol of potassium carbonate were poured into DMF and stirred. The reaction was carried out for 3 hours at 70° C. under a pressure reduced to not more than 100 mmHg. The reaction product was poured into water and a white powder was collected from the resulting precipitate by filtration. GPC conducted similarly to Example 1 revealed that the white powder was a polymer having a Mw of from 3,000 to 100,000.

The infrared absorption spectrum of the white powder showed an absorption peak due to the ester bond in glycoester at around 1720 cm$^{-1}$. Since an absorption peak due to trimethyl aconitate was not observed, it was understood that all of the aconitic-acid component contained in the glycopolymer had reacted with the saccharide.

EXAMPLES 18 to 21

Polymeric compounds were synthesized according to the same method as in Example 17, except that cellotriose, cellotetraose, cellopentaose, and cellohexaose were respectively employed instead of cellobiose and the reaction conditions were changed as shown in Table 3. The infrared absorption spectrum of each resulting polymeric compound exhibited a peak due to the ester in the glycoester at around 1720 cm$^{-1}$. Since an absorption peak due to trimethyl aconitate was not observed, it was understood that all of the aconitic-acid component contained in the polymeric compound had reacted with the saccharide.

TABLE 3

| Example No. | Saccharide | Triester (mol) | Potassium carbonate (mol) | Reaction Temp. (° C.) | Reaction time (hours) |
| --- | --- | --- | --- | --- | --- |
| 18 | Cellotriose | 3.0 | 0.1 | 80 | 10 |
| 19 | Cellotetraose | 2.5 | 0.15 | 90 | 30 |
| 20 | Cellopentaose | 5.5 | 0.2 | 100 | 46 |
| 21 | Cellohexaose | 6.0 | 0.2 | 100 | 46 |

Note: the quantities of triester (trimethyl aconitate) are shown by their ratios in relation to 1 mol of saccharide.

EXAMPLE 22

In the first reaction step, a condensate of cellobiose and a diester of aconitic acid, which condensate had the schematic structure shown in FIG. 5, was prepared by ester interchange using dimethyl aconitate (in which any two of the three carboxylic groups had been methylesterified) with cellobiose as an oligosaccharide.

Cellobiose, dimethyl aconitate, and an enzyme (PROLEATHER) having a pH adjusted to approximately 9.5 were poured into pyridine and stirred at 40 to 50° C. In this Example, 1.1 mol of dimethyl aconitate was used with respect to 1 mol of cellobiose, and 0.06 g of enzyme was used with respect to 1 g of cellobiose. Ten days later, the reaction mixture was poured into water to obtain a white water-insoluble substance (hereinafter referred to as "resin 1"). The Mw of resin 1 measured by GPC was from 2,000 to 6,000. The infrared absorption spectrum of resin 1 showed absorption due to C=O bonds in the glycoester and COOH or COO— in the aconitic acid at 1750 to 1550 cm$^{-1}$.

In the second reaction step, resin 1 was immersed in a solution of cellobiose in pyridine for 15 min., dried, and then heated at 70 to 100° C. for 10 min. The infrared absorption spectroscopy of the resulting polymeric compound revealed that the absorption intensity due to COOH or COO— decreased to not more than one tenth that of the resin 1. Furthermore, GPC which had been carried out similarly to Example 1 showed that the Mw of the resulting polymeric compound increased by two to ten times that of resin 1. Therefore, it was understood that the resin 1 was crosslinked by cellobiose.

EXAMPLES 23 to 26

Polymeric compounds were synthesized according to the same two-step method as in Example 22, except that cellotriose, cellotetraose, cellopentaose, and cellohexaose were respectively employed instead of cellobiose and the reaction conditions were changed as shown in Table 4.

As a result, similar to Example 22, the infrared absorption spectrum of the resulting polymeric compound revealed that the absorption intensity due to COOH or COO— decreased to not more than one tenth that of the resin 1 obtained in the first reaction step. Furthermore, GPC conducted similar to that in Example 1 indicated that the Mw of the resulting polymeric compound increased by two to ten times that of resin 1. Therefore, it was understood that the resin 1 was crosslinked by cellobiose.

TABLE 4

| Example No. | Saccharide | Diester (mol) | Enzyme (mol) | Reaction Temp. (° C.) | Reaction time (hours) |
| --- | --- | --- | --- | --- | --- |
| 23 | Cellotriose | 0.9 | 0.06 | 40 | 240 |
| 24 | Cellotetraose | 1.0 | 0.06 | 50 | 240 |
| 25 | Cellopentaose | 1.2 | 0.06 | 45 | 240 |
| 26 | Cellohexaose | 2.0 | 0.06 | 45 | 240 |

Note: the quantities of diester (dimethyl aconitate) are shown by their ratios in relation to 1 mol of saccharide.

EXAMPLE 27

A polymeric compound containing a glycopolymer having the general structure shown in FIG. 7 was synthesized according to the following method:

One mol of cellobiose and 1.5 mol of ethyl triisocyanate were stirred in dry tetrahydrofuran (hereinafter referred to as "THF") for 5 hours at room temperature. Polyvinyl alcohol having a Mw of 500 was added to the resulting reaction solution, followed by stirring for a further 10 hours. A greatly excessive quantity of water was added to the reaction solution to collect a precipitate. Measurement using a low-angular light scattering apparatus revealed that the resulting precipitate was a polymeric compound having an absolute molecular weight of 10,000 to 100,000.

The NMR and infrared absorption spectra of the polymeric compound did not have a peak due to the NCO group and showed a peak specific to the urethane bond. Therefore, it was assumed that the resulting polymeric compound had a structure in which isocyanic acid portions in a polymer chain prepared by reaction between cellobiose and ethyl triisocyanate were crosslinked by polyvinyl alcohol.

EXAMPLES 28 to 33

Polymeric compounds were synthesized according to the same method as in Example 27, except that saccharides shown in Table 5 were respectively employed instead of cellobiose and the reaction conditions were changed as shown in Table 5. As a result, it was assumed that each of the resulting polymeric compounds obtained from Examples 28 to 33 had a structure in which isocyanic acid portions in a polymer chain prepared by reaction between an oligosaccharide or acetylated oligosaccharide and ethyl triisocyanate were crosslinked by polyvinyl alcohol.

TABLE 5

| Example No. | Saccharide | Ethyl triisocyanate (mol) | Reaction Temp. | Reaction time (hours) |
|---|---|---|---|---|
| 28 | Cellotriose | 2.0 | Room Temp. | 7 |
| 29 | Cellotetraose | 2.5 | Room Temp. | 7 |
| 30 | Cellopeotaose | 3.0 | Room Temp. | 10 |
| 31 | Cellohexaose | 3.0 | Room Temp. | 10 |
| 32 | Acetylated cellobiose (acetylation degree of 1.5) | 1.5 | Room Temp. | 5 |
| 33 | Acetylated pentaose (acetylation degree of 1.5) | 2.0 | Room Temp. | 6 |

Note: the quantities of ethyl triisocyanate are shown by their ratios in relation to 1 mol of saccharide.

EXAMPLE 34

A glycopolymer having the general structure shown in FIG. 3 was synthesized according to the following method:

Five grams of resin (Mw of 50,000) synthesized from cellobiose and dimethyl adipate were poured into dioxane and then 3.7 g of dimethylaminopyridine and 3.0 g of adipic acid chloride were added dropwise thereto in a nitrogen atmosphere, followed by stirring for 20 hours at 50° C. A white powder, obtained from the resulting reaction mixture, was subjected to GPC. As a result, the molecular weight of the white powder was two to eight times larger than that of the resin measured before the reaction. The infrared absorption spectroscopy of the white powder revealed that the intensity of an absorption peak due to the C=O bond in the ester bond was higher than that shown in FIG. 8. Therefore, it was understood that esterification occurred in the saccharide portions in the resin of Example 1 and resulted in crosslinks by adipic acid.

EXAMPLE 35

Figure 14:
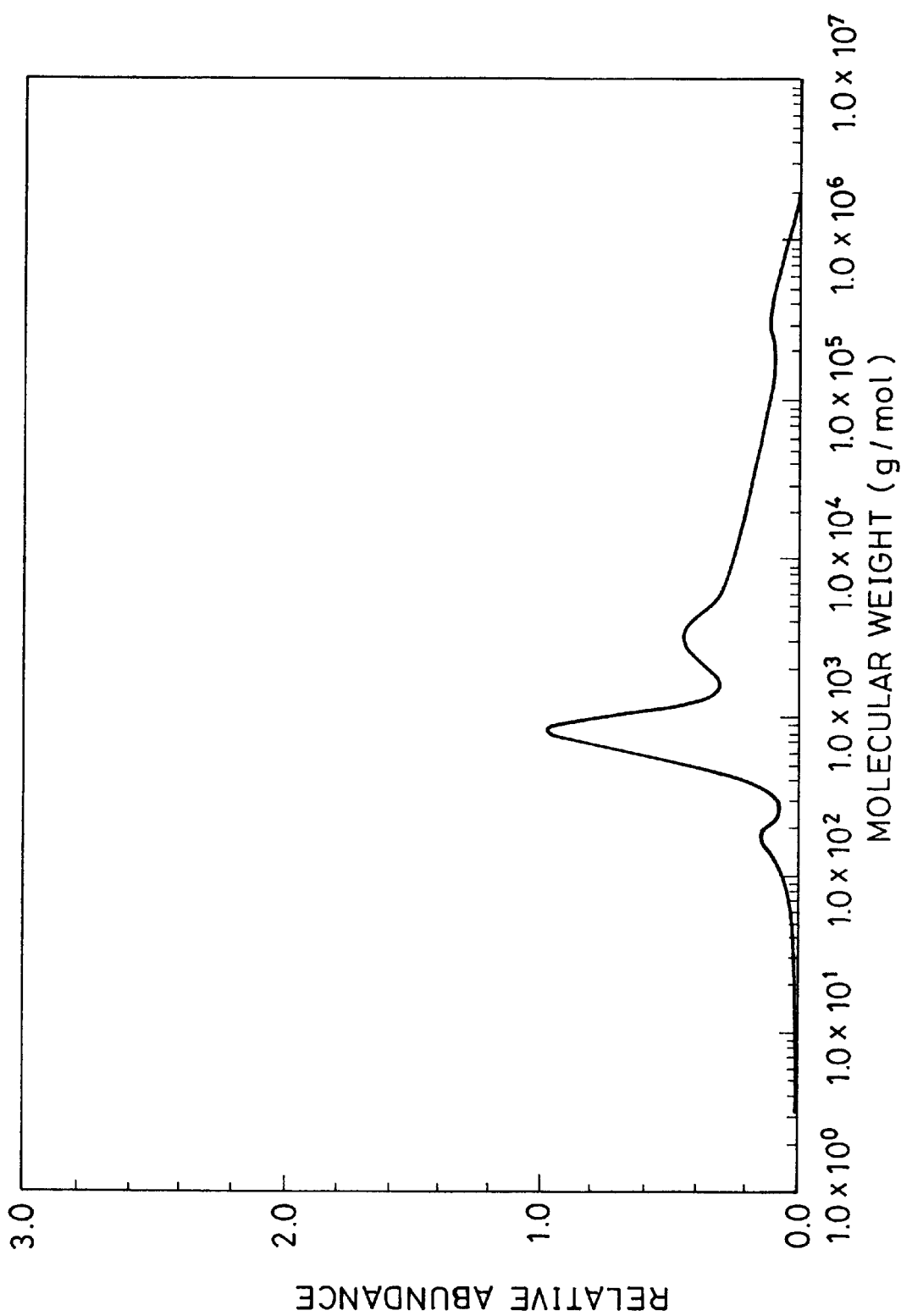
FIG. 14 shows the molecular weight distribution of the glycopolymer prepared in Example 35.
Figure 15:
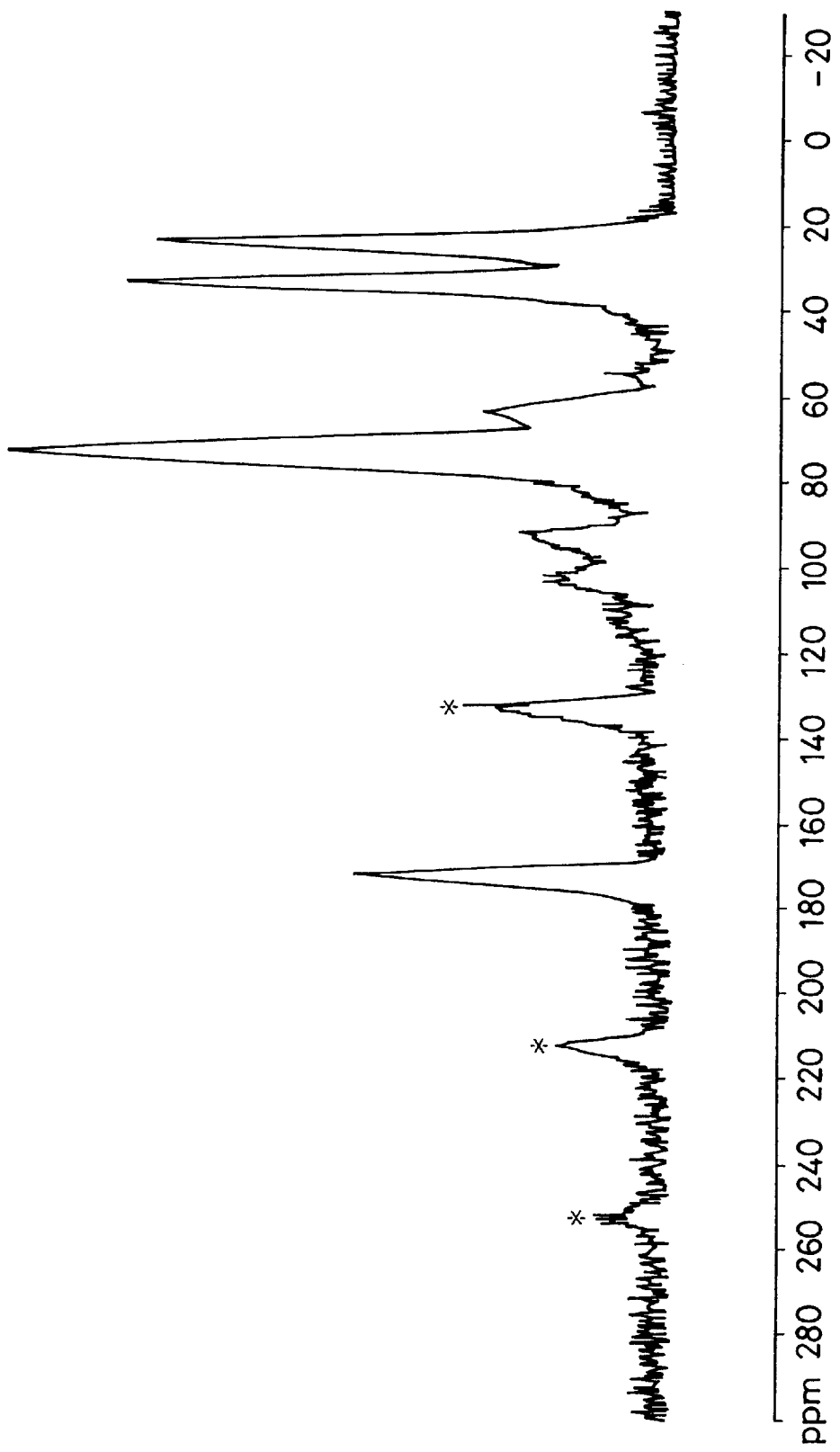
FIG. 15 shows a NMR spectrum of the glycopolymer prepared in Example 35.
Figure 16:
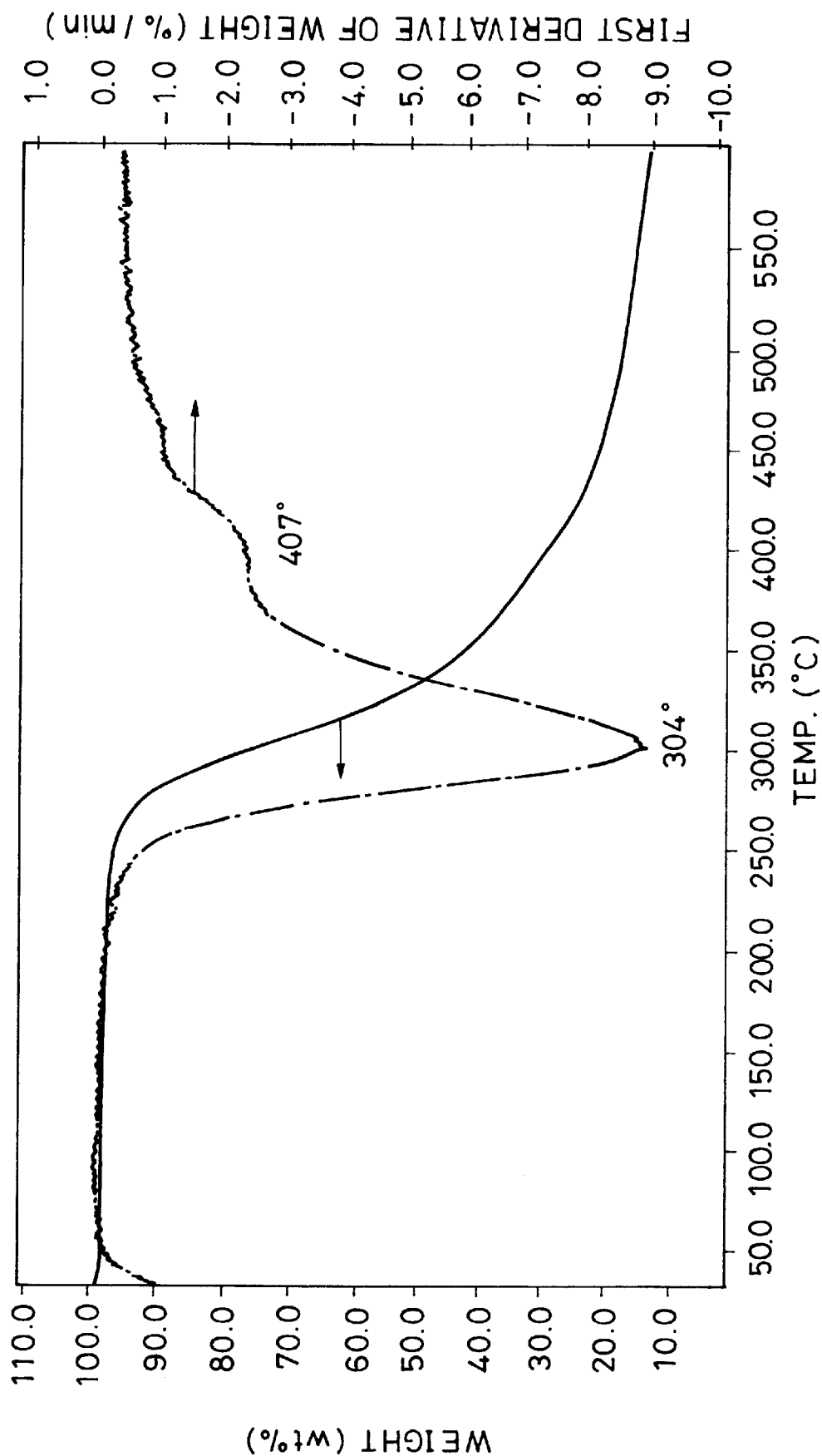
FIG. 16 shows the result of a thermogravimetric analysis of the glycopolymer prepared in Example 35.

A glycopolymer having the general structure shown in FIG. 2 was synthesized according to the following method:

One mol of cellobiose and 0.05 mol of adipic acid in a solid form were placed into a flask and solubilized by stirring at 200 to 230° C. for 45 min. Unreacted materials were removed from the reaction mixture using ethanol. The resulting white powder was subjected to measurement by a low-angular light scattering apparatus. FIG. 14 shows the distribution of the absolute molecular weight of the white powder. FIG. 15 shows the NMR spectrum of the white powder. Although the NMR spectrum has some peaks (indicated by*) due to impurities, it indicates that cellobiose is linked by ester bonds. Considering the molecular weight, the white powder, i. e., a polymeric compound, had a structure consistent with cellobiose and adipic acid being three-dimensionally polymerized by ester bonds. The decomposition temperature of the polymeric compound measured by a thermal analysis was 304° C. which was approximately 150° C. higher than that of the sucrose-containing polymeric compound described by D. R. Patil et al. FIG. 16 shows the result of a thermogravimetric analysis of the polymeric compound obtained in Example 35.

EXAMPLE 36

A glycopolymer having the structure shown in FIG. 1 was synthesized according to the following method:
Synthesis of chitobiose-adipamide After dissolving 8.77 g (0.06 mol) of adipic acid and 18.3 g (0.13 mol) of p-nitrophenol in 85 ml of DMF, 26 g (0.16 mol) of dicyclohexylcarbodiimide was added thereto, followed by stirring at 0° C. for 40 min. and then stirring further for 2 hours at room temperature. The resulting mixture was then allowed to stand for 2 hours in a refrigerator at 8° C., subjected to filtration to remove dicyclohexyl urea, and washed with a small quantity of DMF. The filtrate and the washings were combined, mixed with 3 liters of water, and then allowed to stand overnight so that the precipitated crystals could be collected by filtration. The collected crystals were washed with water, dried, and then dissolved in 500 ml of hot ethanol. The solution was filtered to remove a small quantity of dicyclohexyl urea and the filtrate was evaporated to 300 ml of liquid to precipitate a solid. The solid crystals were collected by filtration. The resulting crystals were subjected to recrystallization from hot ethanol to yield 3.1 g of crystallized p-nitrophenyl ester of adipic acid.

After dissolving 2.8 g of chitobiose in 35 ml of acetic acid, 30 ml of a solution of 4 mol hydrogen bromide in acetic acid was added thereto. The mixture was allowed to stand for 1 hour at room temperature and then mixed with 450 ml of ether to form a precipitate. The resulting precipitate was colleceted by filtration. The collected precipitate was then washed with ether, dried, and dissolved in 9 ml of dioxane. To the resulting solution, 2.6 ml of triethylamine and 1.6 g of p-nitrophenyl ester of adipic acid synthesized as above were added, and a reaction was carried out for 18 hours. The reaction solution was then mixed with 75 ml of ethyl acetate to collect a precipitated solid by filtration. The resulting solid was placed in a funnel, washed with 75 ml of ethyl acetate, 100 ml of ethanol, and 100 ml of ethyl acetate in that order, and then dried to yield 2.8 g of a solid.

The following results of infrared absorption spectroscopy (IR spectroscopy) and NMR spectroscopy of the solid confirmed the existence of the peptide bonds in the solid: IR spectrum (KBr) ($v_{C-H}$; 2910 cm$^{-1}$, $v_{amide\ III}$; 1250 cm$^{-1}$, and $V_{amide\ I}$; 1664 cm$^{-1}$); NMR spectrum (CDCl$_3$, TMS) (7.3 to 8.2 ppm).

The solid was a polymeric compound having a Mw of approximately 20,000 base on the results of GPC employing a TSK-GEL (manufactured by Tosoh Corporation), two GMPWXL columns, with a solution of 0.1 mol $NaNO_3$ as an eluent.

It is assumed from the above results that a linear-chain glycopolymer composed of chitobiose.adipic amide was synthesized according to this example.

EXAMPLES 37 to 40

Solids were synthesized according to the same method as in Example 36, except that oligosaccharides shown in Table 6 were respectively employed instead of chitobiose and the reaction conditions were changed as shown in Table 6.

TABLE 6

| Oligosaccharide | Adipate (g) | Reaction time (hours) | Yield (g) |
| --- | --- | --- | --- |
| Chitotriose | 1.6 | 19 | 2.7 |
| Chitotetraose | 1.7 | 19 | 2.5 |
| Chitopentaose | 1.9 | 20 | 2.4 |
| Chitohexaose | 1.8 | 18 | 2.5 |

Note: the quantities of adipate (p-nitrophenylester of adipic acid) are shown by their ratios in relation to 2.6 g of saccharide.

The existence of peptide bonds in the solids obtained in Examples 37 to 40 was confirmed from the IR spectrum and NMR spectrum of each solid. Furthermore, GPC conducted similar to Example 36 revealed that each solid was a polymeric compound having a Mw of 20,000 to 80,000.

From the above, it was assumed that glycopolymers each composed of the corresponding oligosaccharide-adipic amide were synthesized in Examples 37 to 40.

EXAMPLE 41

Sodium alginate having a viscosity of 100 to 150 cp at 25° C. (manufactured by Wako Pure Chemical Industries, Ltd.) was added to a solution of 1N hydrochloric acid and stirred for 5 hours at room temperature to prepare alginic acid.

While under reflux, 3 g of alginic acid and 100 ml of thionyl chloride were stirred for 22 hours. The resulting mixture was then subjected to the following procedure repeated twice: the mixture was evaporated under reduced pressure to remove thionyl chloride; the resulting residue was mixed with benzene and the mixture was subjected to evaporation under reduced pressure to remove thionyl chloride.

The resulting residue was dissolved in 300 ml of benzene and poured into a three-neck distillation flask equipped with a reflux condenser and a dropping funnel. In a nitrogen atmosphere, 1.9 g of hexamethylenediamine and 0.6 mg of triethylamine dissolved in 100 ml of benzene were added dropwise to the flask over a period of 3 hours while stirring under reflux. The resulting mixture was further stirred for 20 min. under reflux after the addition, followed by stirring for 3 hours at room temperature. A solid was precipitated and collected from the resulting mixture by filtration and washed with a 5 wt % sodium carbonate solution, a 2 wt % hydrogen bromide solution, and a saturated sodium chloride solution, in that order.

After drying the washed solids over sodium sulfate, the solvent was removed by evaporation to give a solid sample. The sample was then subjected to the IR spectroscopy and NMR spectroscopy so as to confirm the peptide-bond formation.

EXAMPLE 42

While under reflux, 1 g of D-glucuronyl-β-1,2-D-glucuronic acid was dissolved in 150 ml of thionyl chloride, followed by stirring for 20 hours. The resulting mixture was then evaporated under reduced pressure to remove thionyl chloride. Together with 300 ml of anhydrous benzene, the resulting residue was poured into a three-neck distillation flask equipped with a reflux condenser and a dropping funnel. In a nitrogen atmosphere, 0.3 g of tetramethylenediamine and 0.1 mg of triethylamine dissolved in 30 ml of benzene were added dropwise into the flask over 2 hours while stirring under reflux. The resulting mixture was further stirred for 20 min. under reflux after the addition, followed by stirring for 3 hours at room temperature without reflux. A solid was precipitated and collected from the resulting mixture by filtration and washed with a 5 wt % sodium carbonate solution, a 2 wt % hydrogen bromide solution, and a saturated sodium chloride solution, in that order.

After drying the washed solids over sodium sulfate, the solvent was removed by evaporation to give a solid sample. The sample was subjected to the IR spectroscopy and NMR spectroscopy so as to confirm the peptide-bond formation. (Decomposition and Resynthesis)

EXAMPLES 43 to 47

(Decomposition and Resynthesis of the polymeric compounds synthesized in Examples 1 to 5)

Figure 17:
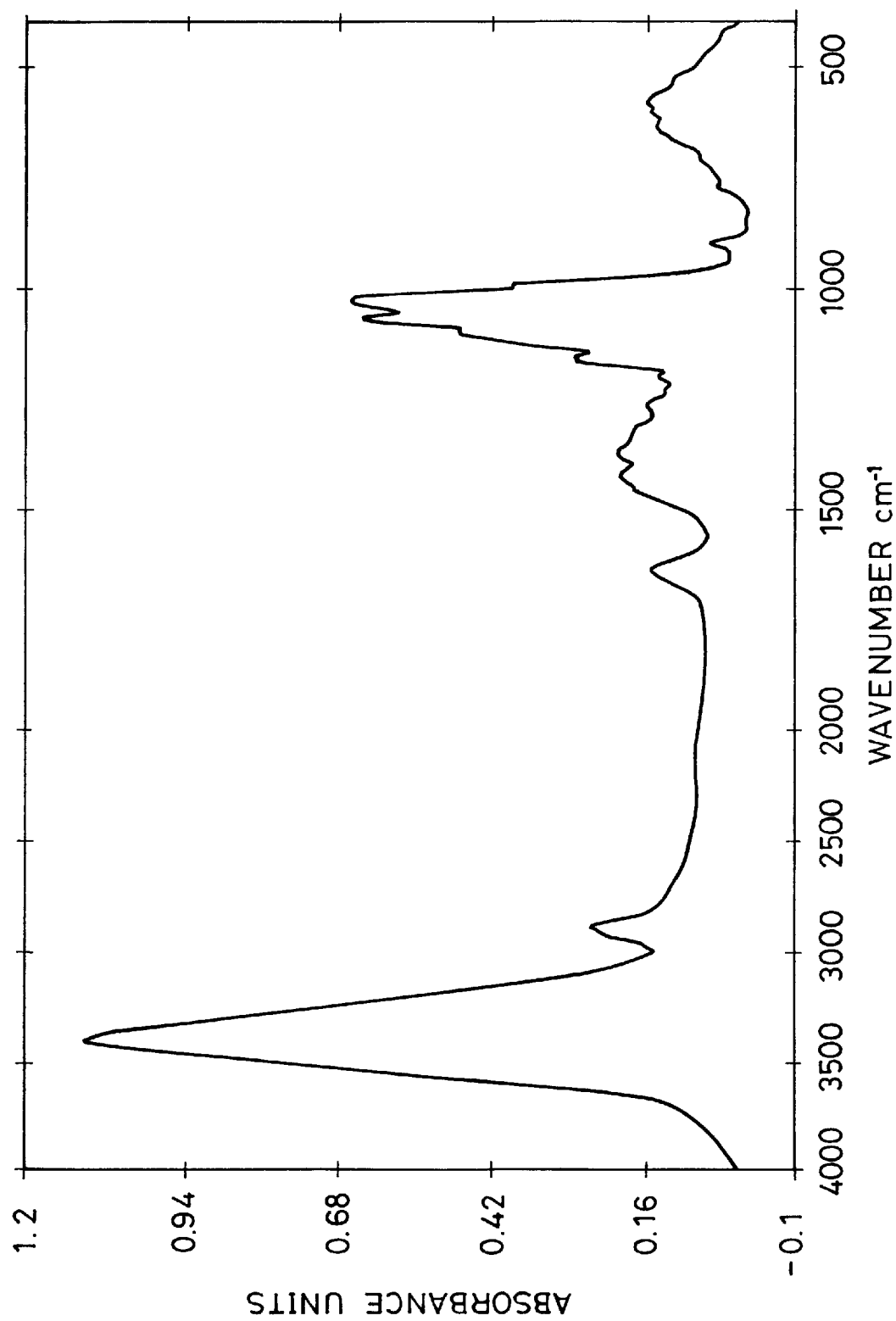
FIG. 17 shows an infrared absorption spectrum of a decomposition product obtained in Example 43.
Figure 18:
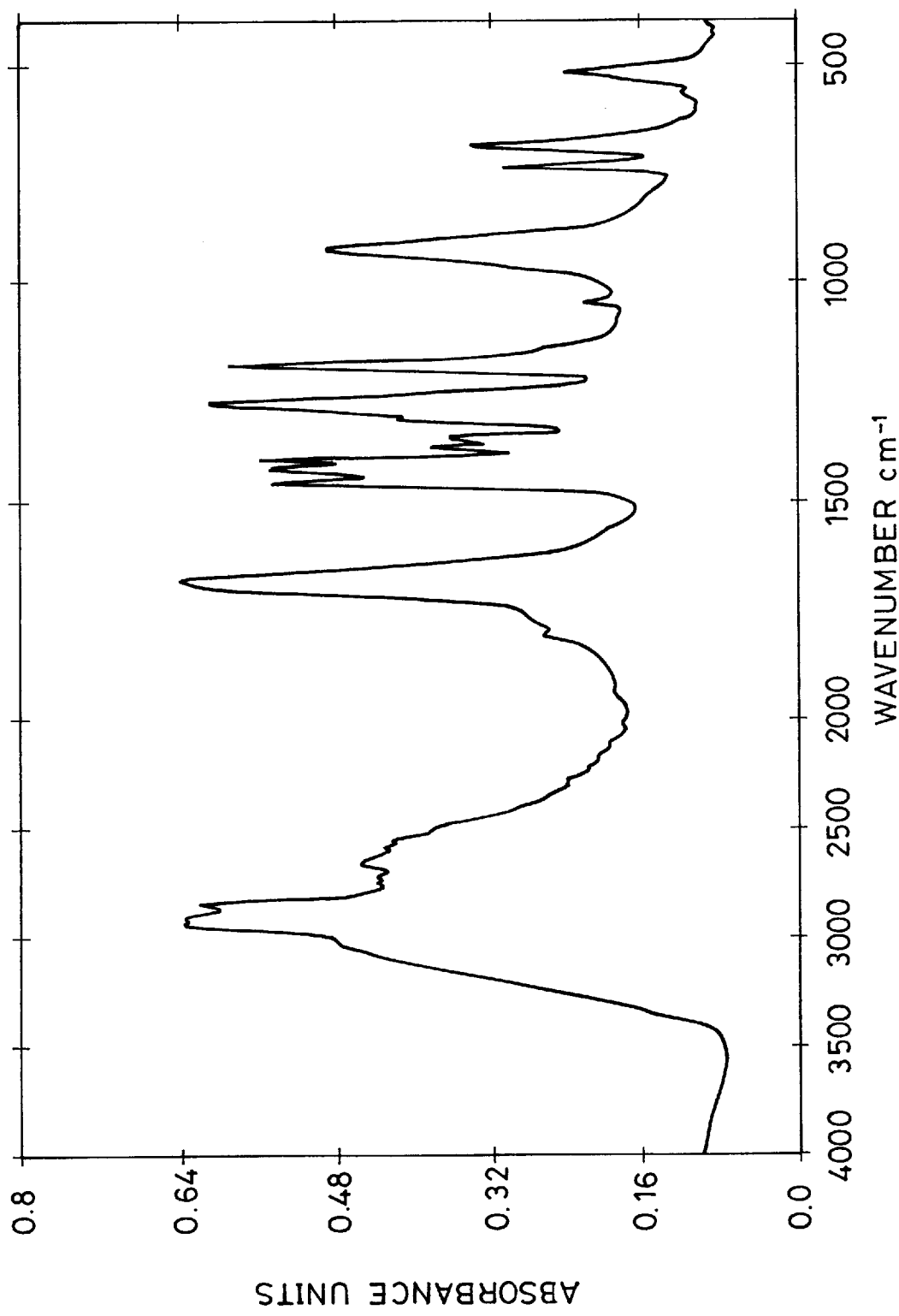
FIG. 18 shows an infrared absorption spectrum of another decomposition product obtained in Example 43.

Under the reaction conditions shown in Table 7, esterase (manufactured by Boehringer Mannheim) was allowed to react with the polymeric compounds synthesized in Examples 1 to 5. Seven days later, the reaction solution was subjected to Mw measurement by high performance liquid chromatography (hereinafter referred to as "HPLC") using a SH-1011 column (manufactured by Shodex) with water as an eluent. This revealed peaks with retention times corresponding to those of oligosaccharide and adipic acid. These peaks were fractionated and identified as being due to oligosaccharide and adipic acid. For example, the IR spectra (FIGS. 17 and 18) of fractions collected by GPC in Example 43 agreed with those of cellobiose and adipic acid. For measurement, cellobiose was dispersed in potassium bromide powder and formed into a pellet, and adipic acid was dispersed in nujol mull. FIG. 17 shows the IR spectrum of cellobiose obtained as a decomposition product in Example 43. FIG. 18 shows the IR spectrum of adipic acid obtained as a decomposition product in Example 43.

The same polymeric compound as that prepared in Example 1 could be obtained as follows: the fractionated oligosaccharide and newly prepared dimethyl adipate were mixed together at the same mixture ratio as in Example 1 and dissolved by stirring for 45 min. at 200 to 230° C. Furthermore, a similar polymeric compound as that prepared in Example 35 could be obtained by dissolving and polymerizing the fractionated oligosaccharide and the fractionated adipic acid according to a similar method to Example 35. Therefore, it was understood that the enzyme decomposition products of the polymeric compounds prepared in Examples 1 to 5 could be readily recycled.

TABLE 7

| Example No. | pH | Decomposition Temp. (° C.) | Enzyme (g) |
| --- | --- | --- | --- |
| 43 | 8.0 | ≦30 | 0.01 |
| 44 | 8.6 | ≦30 | 0.01 |
| 45 | 7.5 | ≦45 | 0.05 |

TABLE 7-continued

| Example No. | pH | Decomposition Temp. (° C.) | Enzyme (g) |
|---|---|---|---|
| 46 | 9.0 | ≦40 | 0.1 |
| 47 | 8.6 | ≦30 | 0.1 |

EXAMPLES 48 to 52

Decomposition and Resynthesis of the Polymeric Compounds Synthesized in Examples 6 to 10

1 g of each of the polymeric compounds obtained in Examples 6 to 10 was reacted with 0.05 g of esterase (manufactured by Boeringer Mnnheim) under the condition that pH was maintained at 7.5 and the temperature was maintained at 45° C. After 10 hours, supernatant liquids of the respective reaction liquids were sampled and measured for Mw in the same manner as in Example 43. HPLC revealed two new peaks whose intensity were gradually increased with lapse of time.

Fractions corresponding to the two peaks were collected and subjected to IR spectroscopy, which confirmed that each of the peaks was based on the existence of oligosaccharide and pimelic acid. For example, in Example 48, the position of each of the peaks was same as that of cellobiose and pimelic acid, both of which are the starting materials.

The fractionated oligosaccharide and newly prepared dimethyl pimelate were mixed together at the same mixture ratio as in Examples 6 to 10 and dissolved by stirring for 45 min. at 200 to 230° C. Furthermore, a similar polymeric compound as that prepared in Example 35 could be obtained by dissolving and polymerizing the fractionated oligosaccharide and the fractionated pimelic acid according to a similar method to Example 35. Therefore, it was understood that enzyme decomposition products of the polymeric compounds prepared in Examples 6 to 10 could be readily recycled.

EXAMPLES 53 to 57

Decomposition and Resynthesis of the Polymeric Compounds Synthesized in Examples 12 to 16

Each of the polymeric compounds synthesized in Examples 12 to 16 was mixed with esterase (manufactured by Boehringer Mannheim) and stirred. The reaction conditions were as follows: 1 g of each polymeric compound was added to 0.05 g of the enzyme adjusted to pH 7.5, followed by stirring at 45° C. Ten hours after initiation of stirring, a portion of the reaction supernatant was collected and subjected to HPLC similar to Examples 43 to 47. HPLC revealed two new peaks whose intensity gradually increased with lapse of time. Two weeks later, fractions corresponding to these peaks were collected and subjected to the IR spectroscopy. As a result, the two peaks caused by addition of the enzyme were identified as being due to oligosaccharide and acrylic acid, respectively.

When the fractionated acrylic acid was esterified and allowed to react with an oligosaccharide, a polymeric compound was obtained. According to ester interchange using an enzyme, the resulting polymeric compound had a Mw of 2,000 to 4,000. The Mw of the resulting polymeric compound was 3,000 to 8,000 under conditions employed in Examples 12 to 16.

EXAMPLES 58 to 62

Decomposition and Resynthesis of the Polymeric Compounds Synthesized in Examples 17 to 21

Each of the polymeric compounds synthesized in Examples 17 to 21 was decomposed using esterase (manufactured by Boehringer Mannheim K. K. ). For decomposition, 1.0 g of each polymeric compound was mixed with 0.05 g of the enzyme adjusted to pH 7.5, followed by stirring at 45° C. The reaction supernatant collected 10 hours after initiation of reaction was subjected to HPLC. As a result, two peaks with retention times almost corresponding to oligosaccharide and aconitic acid were observed. The intensity of these two peaks gradually increased with lapse of time and reached constant values after 1 week. Fractions corresponding to the two peaks were collected and subjected to NMR spectroscopy by which the peaks were identified as being due to oligosaccharide and aconitic acid.

The fractionated aconitic acid was trimethylesterified and subjected to reaction by a similar method to Examples 17 to 21 with the corresponding oligosaccharide produced by decomposition. Polymeric compounds similar to those prepared in Examples 17 to 21 were thereby obtained. Therefore, it was understood that enzyme decomposition products of the polymeric compounds prepared in Examples 17 to 21 could be readily recycled.

EXAMPLES 63 to 69

Decomposition and Resynthesis of the Polymeric Compounds Synthesized in Examples 27 to 33

Each of the polymeric compounds synthesized in Examples 27 to 33 was press-molded into a disk-shape having a diameter of 2 cm and thickness of 1 mm and then buried in garden soil at 3 cm depth. One year after burying, the polymeric compound was found to be totally decomposed without remains of the molded shape.

The polymeric compound prepared in Example 27 was placed in a 0.1N hydrochloric acid solution and stirred. After 24 hours, the resulting reaction solution was subjected to HPLC conducted similarly to Examples 43 to 47. The resulting reaction solution mainly contained glucose, cellobiose, and isocyanic acid. The saccharide mixture was fractionated from the reaction solution. Then, 10 g of the fractionated saccharide mixture was mixed with 5 g of adipic acid and dissolved by stirring while heating. The resulting compound had a similar NMR spectrum to that shown in FIG. 15.

EXAMPLE 70

Decomposition and Resynthesis of the Polymeric Compound Synthesized in Example 34

To 1 g of the polymeric compound prepared in Example 34, 0.1 g of esterase (pH 9.0) was added, followed by stirring at 40° C. After 1 week, the reaction solution was filtered to remove the enzyme and subjected to HPLC. As a result, two peaks with retention times corresponding to cellobiose and adipic acid, respectively, were observed. These peaks were identified as being due to cellobiose and adipic acid from the IR spectroscopy and NMR spectroscopy.

The reaction solution from which the enzyme had been removed was lyophilized to remove the water solvent. The resulting powder and lipase (pH 8.0) were poured into pyridine at a weight ratio of 1:0.04. Reaction was carried out in a nitrogen atmosphere at 45° C. for 3 weeks. A water-insoluble substance was collected from the resulting solid, which substance was revealed to be a polymeric compound having an IR spectrum similar to that shown in FIG. 8.

EXAMPLE 71

Decomposition and Resynthesis of the Polymeric Compound Snthesized in Example 35

To 1 g of the polymeric compound prepared in Example 35, 0.1 g of esterase (pH 9.0) was added, followed by stirring at 40° C. After 1 week, the reaction solution was filtered to remove the enzyme and subjected to HPLC. As a result, two peaks with retention times corresponding to cellobiose and adipic acid, respectively, were observed. These peaks were identified as being due to cellobiose and adipic acid from the IR spectroscopy and NMR spectroscopy.

The reaction solution from which the enzyme had been removed was lyophilized to remove the water solvent. The resulting powder and the enzyme (PROLEATHER) (pH 8.0) were poured into pyridine at a weight ratio of 1:0.03. Reaction was carried out in a nitrogen atmosphere at 45° C. for 3 weeks. A water-insoluble substance was collected from the resulting solid, which substance was revealed to be a polymeric compound having an IR spectrum similar to that shown in FIG. 8.

EXAMPLE 73

Using 0.15 mol of potassium carbonate as a catalyst, 1 mol of maltose was subjected to reaction in DMSO with 1 mol of diethyl adipate at 70° C. under a pressure reduced to not more than 100 mmHg for 3 hours, and ethanol, i.e., a by-product of the reaction, was removed. A solid substance insoluble in water was isolated from the resulting reaction product. Measurement carried out similar to Example 1 revealed that the solid substance was a polymeric compound having a Mw of from 70,000 to 160,000. From infrared absorption spectroscopy of the resulting polymeric compound, an absorption peak due to ester bonds is observed at approximately 1735 $cm^{-1}$. The NMR spectrum of the resulting polymeric compound indicated that esterification occurred mainly in the 6-position of glucopyranose rings in maltose.

Two grams of the resulting polymeric compound was poured into dioxane and then 1.2 g of D-glucuronyl-β-1,2-D-glucuronyl chloride and 2 ml g of pyridine were added dropwise thereto in a nitrogen atmosphere, followed by stirring for 22 hours at 50° C. A white powder was obtained from the resulting reaction mixture and was subjected to GPC. As a result, the molecular weight of the white powder was three to eight times larger than that of the polymeric compound measured before the reaction. The infrared absorption spectroscopy of the resulting resin revealed that the intensity of an absorption peak due to the C=O bond in ester bond increased. Therefore, it was understood that esterification occurred in the saccharide portions in the resin composed of ester of maltose and adipic acid and resulted in crosslinks by D-glucuronyl-β-1,2-D-glucuronic acid.

It will be apparent to those of ordinary skill on this art that other additions, deletions, modifications and substitutions can be made within the purview of this invention in addition to the description of the preferred embodiments and illustrated Examples provided.

The invention is not to be limited except as set forth in the following claims.

What is claimed is:

1. A copolymer having a repeating unit consisting of a saccharide component and a bifunctional compound, wherein the saccharide component is D-glucuronyl-β-1,2-glucuronic acid.

2. The copolymer according to claim 1, wherein the bifunctional component is a diamine.

3. A method of decomposing a copolymer described in claim 1, comprising selectively decomposing a bond between the saccharide component and the bifunctional compound.

4. A method according to claim 3, wherein said step of selectively decomposing a bond is conducted employing an enzyme and wherein said enzyme is endopeptidase or exopeptidase.

5. A method according to claim 4, wherein said endopeptidase is at least one enzyme selected from the group consisting of chymotrypsin, Staphylocccus protease, Streptomcyes griseus protease, subtilisin, trypsin, serine protease, pronase, thiol protease, thermolysin, collagenase, Armillarimellea protease and carboxyl protease.

6. A method according to claim 4, wherein said exopeptidase is at least one enzyme selected from the group consisting of aminopeptidase, aminopeptidase M, pyrrolidone peptidase and leucine aminopeptidase.

7. A copolymer having a repeating unit consisting of a saccharide component and a bifunctional compound, wherein the saccharide component is an oligosaccharide selected from the group consisting of maltose maltotoriose, maltopentaose and derivatives thereof.

8. The copolymer according to claim 7, wherein the bifunctional compound is a dicarboxylic acid.

9. A method of decomposing a copolymer as described in claim 7 comprising selectively decomposing a bond between the saccharide component and the bifunctional component.

10. The method according to claim 9, wherein the saccharide component and the bifunctional component are bonded together with an enzyme-decomposable bond.

11. The method according to claim 9, wherein the decomposing step is conducted by employing an enzyme.

12. A copolymer having a repeating unit consisting of a saccharide component and a bifunctional compound, wherein said saccharide component is a polysaccharide selected from the group consisting of starch, glycogen, galactan and mixtures thereof.

13. The copolymer according to claim 12, wherein the saccharide component and the bifunctional component are bonded together with an enzyme-decomposable bond.

14. The copolymer according to claim 13, wherein the enzyme-decomposable bond is an ester bond.

15. The copolymer according to claim 12, wherein the bifunctional compound is a dicarboxylic acid.

16. A method of decomposing a copolymer described in claim 12, comprising selectively decomposing a bond between the saccharide component and the bifunctional compound.

17. The method according to claim 16, wherein the saccharide component and the bifunctional component are bonded together with an enzyme-decomposable bond.

18. The method according to claim 17, wherein the decomposing step is conducted by employing an enzyme.

19. A method according to claim 9 or 16, wherein said enzyme is esterase or lipase.

20. The copolymer according to claim 7, wherein the saccharide component and the bifunctional component are bonded together with an enzyme-decomposable bond.

21. The copolymer according to claim 20, wherein the enzyme-decomposable bond is an ester bond.

* * * * *

UNITED STATES PATENT AND TRADEMARK OFFICE
CERTIFICATE OF CORRECTION

PATENT NO. : 6,316,606 B1
DATED : November 13, 2001
INVENTOR(S) : Hiroyoshi Kishi et al.

It is certified that error appears in the above-identified patent and that said Letters Patent is hereby corrected as shown below:

Column 1,
Line 11, "an" should read -- a --;
Line 30, "cause" should read -- causes --;
Line 31, "s" should be deleted;
Line 50, "ar" should read -- are --.

Column 17,
Line 15, "Mnnheim)" should read -- Mannheim) --.

Column 20,
Line 22, "maltose maltotoriose," should read -- maltose, maltotriose, --;
Line 27, "claim 7" should read -- claim 7, --.

Signed and Sealed this

Fourth Day of June, 2002

*Attest:*

JAMES E. ROGAN
*Attesting Officer*     *Director of the United States Patent and Trademark Office*